US012599520B2

(12) United States Patent
Romeo et al.

(10) Patent No.: US 12,599,520 B2
(45) Date of Patent: Apr. 14, 2026

(54) ELECTRICAL POWER ASSISTANCE DEVICE FOR TRANSPORT WHEELCHAIR

(71) Applicant: Udeego, Inc., Stuart, FL (US)

(72) Inventors: Michael Romeo, Port St. Lucie, FL (US); Susan Penski, Royal Palm Beach, FL (US); David J. Carson, Stuart, FL (US)

(73) Assignee: Udeego, Inc., Stuart, FL (US)

( * ) Notice: Subject to any disclaimer, the term of this patent is extended or adjusted under 35 U.S.C. 154(b) by 535 days.

(21) Appl. No.: 18/173,447

(22) Filed: Feb. 23, 2023

(65) Prior Publication Data

US 2023/0190549 A1 Jun. 22, 2023

Related U.S. Application Data

(63) Continuation of application No. 16/840,277, filed on Apr. 3, 2020, now Pat. No. 11,607,354.

(60) Provisional application No. 62/829,811, filed on Apr. 5, 2019.

(51) Int. Cl.

*A61G 5/04* (2013.01)
*A61G 5/08* (2006.01)

(52) U.S. Cl.

CPC ............ *A61G 5/047* (2013.01); *A61G 5/045* (2013.01); *A61G 5/048* (2016.11); *A61G 5/0816* (2016.11)

(58) Field of Classification Search

CPC ........ A61G 5/045; A61G 5/047; A61G 5/048; A61G 5/0816; A61G 5/0825; A61G 5/0875

USPC ................................ 180/6.5, 11; 280/304.1

See application file for complete search history.

(56) References Cited

U.S. PATENT DOCUMENTS

| | | | | |
|---|---|---|---|---|
| 4,422,515 | A | 12/1983 | Loveless | |
| 5,016,720 | A | 5/1991 | Coker | |
| 5,078,227 | A | 1/1992 | Becker | |
| 5,234,066 | A * | 8/1993 | Ahsing | A61G 5/0825 340/870.37 |
| 5,351,774 | A | 10/1994 | Okamoto | |
| 5,762,154 | A * | 6/1998 | Hsu | A61G 5/047 180/907 |
| 6,547,018 | B1 | 4/2003 | Choi | |
| 6,860,347 | B2 | 3/2005 | Sinclair et al. | |
| 8,684,113 | B1 | 4/2014 | Laconis | |
| 9,050,227 | B1 | 6/2015 | Hargroder | |

(Continued)

FOREIGN PATENT DOCUMENTS

| | | |
|---|---|---|
| DE | 102016118032 | 1/2018 |
| GB | 2543071 | 7/2017 |

(Continued)

*Primary Examiner* — Valentin Neacsu
*Assistant Examiner* — Felicia L. Brittman-Alabi
(74) *Attorney, Agent, or Firm* — McHale & Slavin, P.A.

(57) ABSTRACT

An electrical power assistance device designed to be removably coupled to existing transport wheelchairs to provide electric power to aid in transportation of a person sitting in the wheelchair, while being detachable to allow the transport chair to fold up for easy storage in a car or other vehicle. The electrical power assistance device includes a motor powered by a rechargeable battery, where the motor drives an internal shaft which rotates a pair of friction wheels. A clutch, provided on a separate axle coupled to the friction wheels by eccentric disks, allows the friction wheels to engage or disengage with the rear wheels of the transport wheelchair.

13 Claims, 55 Drawing Sheets

(56) References Cited

U.S. PATENT DOCUMENTS

| | | | |
|---|---|---|---|
| 9,326,901 B2 | 5/2016 | Conti | |
| 9,474,665 B1 | 10/2016 | Chan | |
| 9,687,397 B1 | 6/2017 | Lin | |
| 9,738,300 B2 | 8/2017 | Georgiev et al. | |
| 10,517,780 B2 | 12/2019 | Peskin et al. | |
| 10,555,846 B2 | 2/2020 | Jacobsson | |
| 10,849,803 B2 | 12/2020 | Shim | |
| 2006/0096792 A1 | 5/2006 | Usherovich | |
| 2012/0279789 A1 | 11/2012 | Brill et al. | |
| 2017/0065470 A1 | 3/2017 | Robins | |
| 2018/0133075 A1* | 5/2018 | Jacobsson | A61G 5/045 |
| 2020/0315878 A1 | 10/2020 | Penski | |

FOREIGN PATENT DOCUMENTS

| | | |
|---|---|---|
| KR | 102180116 | 2/2020 |
| WO | WO2012121568 | 9/2012 |

* cited by examiner

ELECTRICAL POWER ASSISTANCE DEVICE FOR TRANSPORT WHEELCHAIR

PRIORITY CLAIM

In accordance with 37 C.F.R. 1.76, a claim of priority is included in an Application Data Sheet filed concurrently herewith. Accordingly, under 35 U.S.C. §§ 119(e), 120, 121, and/or 365(c), the present invention claims priority as a continuation to U.S. patent application Ser. No. 16/840,277, entitled "ELECTRICAL POWER ASSISTANCE DEVICE FOR TRANSPORT WHEELCHAIR", filed Apr. 3, 2020, which claims priority to U.S. Provisional Patent Application No. 62/829,811, entitled "ELECTRICAL POWER ASSISTANCE DEVICE FOR TRANSPORT WHEELCHAIR", filed Apr. 5, 2019; and is related to U.S. patent application Ser. No. 17/327,110, entitled "ELECTRICAL POWER ASSISTANCE DEVICE FOR TRANSPORT WHEELCHAIR", filed May 21, 2021, now U.S. Pat. No. 11,234,874. The contents of the above referenced applications are incorporated herein by reference in their entirety.

FIELD OF THE INVENTION

This invention relates generally to the field of wheelchairs, and in particular, to an assembly which can attach to a transport chair to provide electrical assistance to a caregiver transporting a person in a transport chair.

BACKGROUND OF THE INVENTION

Wheelchairs and similar conveyances are a critical part of allowing mobility for individuals with injuries or medical conditions that prevent them from walking, or which make walking difficult and limiting for the individual. In these types of situations, the person sits in a wheelchair and an operator, sometimes referred to as an escort or caregiver, pushes the wheelchair to transport the person to a desired location. Depending on the location a person is being transported to, the escort often must maneuver the chair and person in and out of elevators, through hallways, around obstacles, in and out of rooms, up and down ramps, etc.

A common situation where a person is confined to a transport wheelchair arises through age and illness, where the person becomes unable to walk for more than short distances. When so affected, it becomes a limitation on that person's ability to participate in activities with the rest of their family; as such, a person can only move about with the help of a caregiver or escort.

When there is a significant weight discrepancy between the person confined to a transport chair and the escort, moving the person and chair up and down ramps or hills can become difficult and dangerous for both parties.

When a smaller caregiver is attempting to push a larger person up a hill, it can take considerable effort to move the person and chair, without the chair rolling backwards into the caregiver. Similarly, when the smaller caregiver is attempting to push the larger person down a hill, it becomes a dangerous situation for the person because the caregiver must attempt to hold the person and chair back from simply coasting out-of-control down the hill.

One alternative to such affected persons is to acquire a powered wheelchair that can be operated by a control typically placed on the arm of the wheelchair. Such wheelchairs, however, are quite expensive. Moreover, powered wheelchairs are more prone to malfunction or simply running down their power source, and they are more difficult to transport between distant locations in a car.

U.S. Pat. No. 9,474,665 discloses a wheelchair that has a chair, an electrical power device, a foot stand, and a control device. The chair has two arm rest frames, and each arm rest frame has a connection board. The electrical power device is detachably connected with the connection boards and has a holding frame, a driving device, and two rear wheels. The holding frame has two holding boards respectively connected with the connection boards by multiple securing assemblies. Each securing assembly has a holding sleeve, a connecting rod, a knob, and a spring. The holding sleeve has multiple abutting ribs. The connecting rod is mounted through the holding sleeve, and has a first end and a second end selectively extending into one of the connecting holes defined in a corresponding connection board. The knob is mounted securely around the second end of the connecting rod and has multiple engaging grooves.

U.S. Pat. No. 9,687,397 discloses an electric wheelchair with quick-release drive wheels, including a chassis, two guide wheels, and two drive wheels. The drive wheels are rotated by a drive mechanism, and connected to the drive mechanism by a quick-release mechanism. To detach the drive wheel, the user can press the cover to make the rolling balls move out of the receiving groove and back to the arc-shaped engaging portion, which allows the hollow shaft to disengage from the drive shaft. Then, continued pressing on the cover can detach the drive wheel from the drive mechanism. To assemble the drive wheel, the user can press the hollow shaft into the axial hole to make the rolling balls engage in the receiving groove, so that the drive wheel is assembled to the drive mechanism. The assembly and disassembly of the drive wheel require no wrenches or other tools, and therefore are very convenient.

U.S. Pat. No. 9,738,300 discloses a carrying apparatus which provides a self-powered, rechargeable, technologically adaptable transport vehicle, such as a stroller. The apparatus includes efficient seating and storage capacities for efficiency items, such as pertinent baby supplies. Because the apparatus is self-powered, the physical stress of carrying at least one item is reduced. Furthermore, the apparatus uses technology to maintain perpetual power for operation, and to regulate and monitor the propulsion of the apparatus during transport. The apparatus may be pushed or pulled in multiple directions at varying velocities. The apparatus includes braking and accelerating capacities. A frame portion supports a seat portion, such as a buckled baby seat, and a storage portion, such as a cargo mesh. A rechargeable power source powers a motor that turns a drive shaft for propulsion. Brakes are positioned at the wheels. A control portion provides a display and levers for accelerating and decelerating.

What is lacking in the art, however, is an electrical device which can attach to a non-electrical wheelchair and allow a caregiver to control the application of electrical power to the chair to assist in transporting a person.

SUMMARY OF THE INVENTION

The presently disclosed invention is designed to work with existing wheelchairs to provide electric power to aid in transportation of a person sitting in the wheelchair, while being detachable to allow the transport chair to fold up for easy storage in a car or other vehicle.

The electrical power assistance device is designed to couple to existing transport wheelchairs. The electrical power assistance device includes a motor powered by a rechargeable battery, where the motor drives an internal shaft which rotates a pair of friction wheels. A clutch, provided on a separate axle coupled to the friction wheels by eccentric disks, allows the friction wheels to engage or disengage with the rear wheels of the transport wheelchair.

A controller is provided which can be coupled to the rear handles of the transport wheelchair, allowing a caregiver or escort to activate the electrical motor to provide power assistance when moving the transport wheelchair. The caregiver or escort operates a trigger which engages the motor inside the housing of the electrical power assistance device. To allow the caregiver or escort to control the transport chair while turning, the drive shaft is provided with a differential.

A switch allows the caregiver or escort to toggle between forward and rearward drive directions. A separate dial allows the caregiver or escort to increase or decrease the relative power of the motor, which is beneficial, depending on the weight of the person sitting in the transport wheelchair.

The housing is removably coupled to the rear portion of the transport wheelchair frame, thus allowing the electrical power assistance device to be coupled to existing transport wheelchairs, and to be removed so that the transport wheelchair can collapse as it is ordinarily designed to do when transporting the wheelchair in a car. To facilitate ease of removal, the electrical connection between the motor and the controller is provided with an electrically releasable coupling, so that the controller need not be removed when the housing is temporarily removed.

Accordingly, it is a primary objective of the instant invention to provide an electrical power assistance device which can be coupled to a standard transport wheelchair to provide power assistance to transporting a person in the wheelchair.

It is a further objective of the instant invention to provide a detachable electrical power assistance device.

It is yet another objective of the present invention to provide a controller, allowing a caregiver or escort to regulate the power assistance provided by the electrical power assistance device.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

Figure 71:
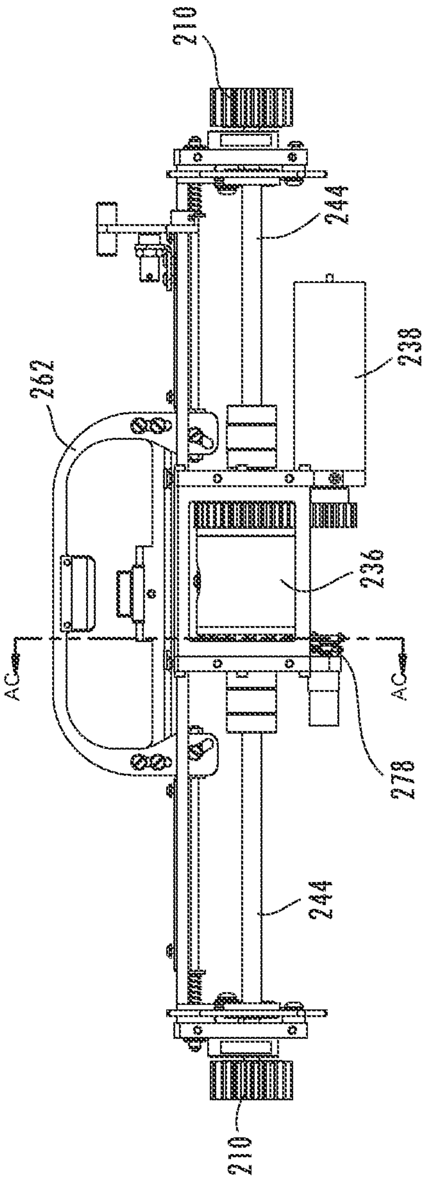
FIG. 71 is rear view of the drive components of an electrical power assistance device.
Figure 72B:
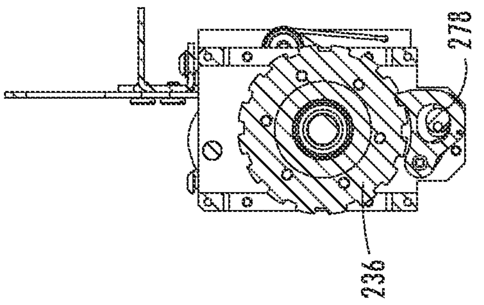
Figure 72A:
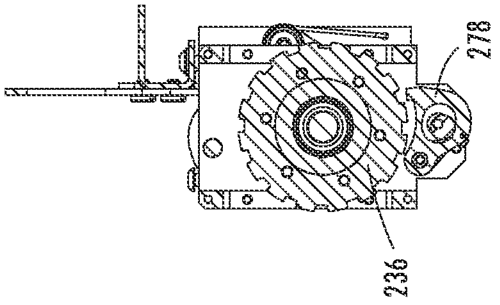
Figure 73:
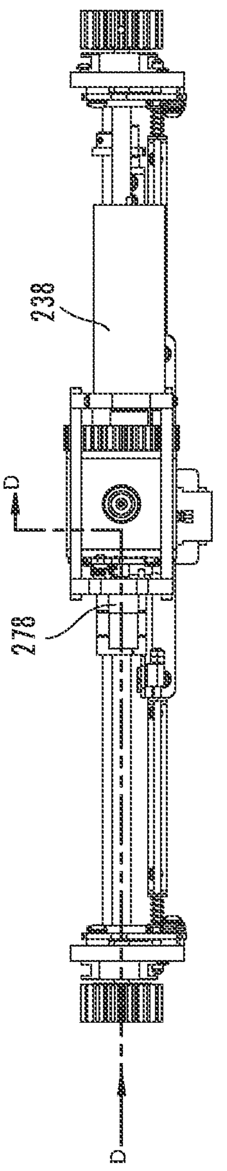
Figure 74:
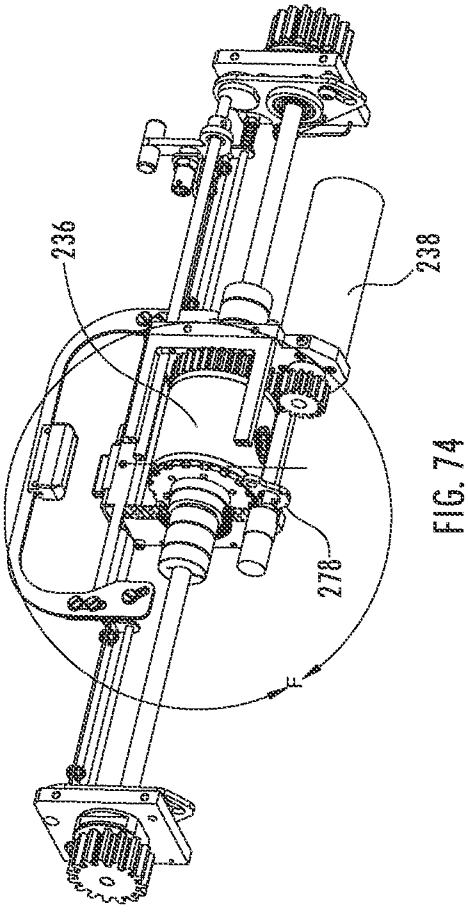
Figure 75:
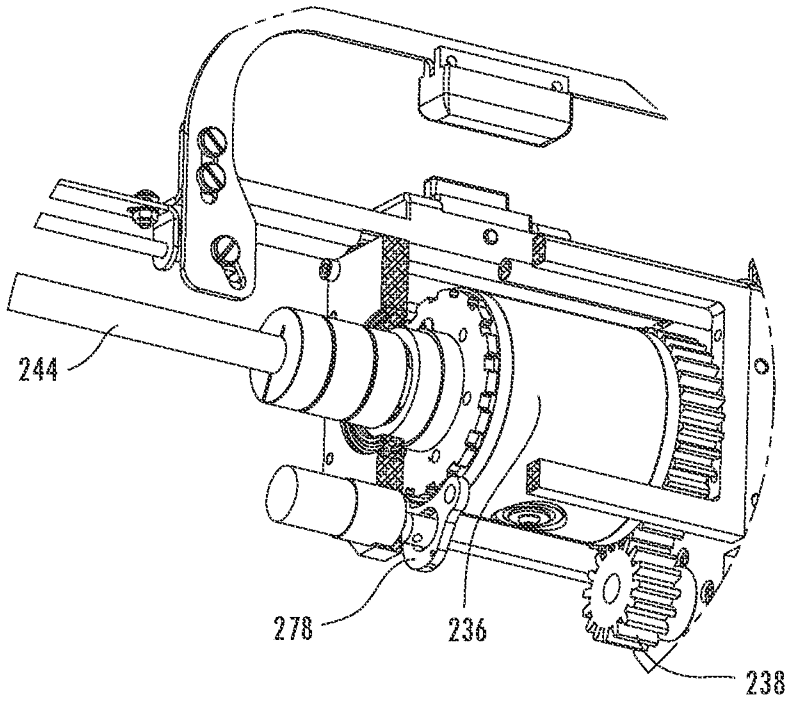
Figure 76:
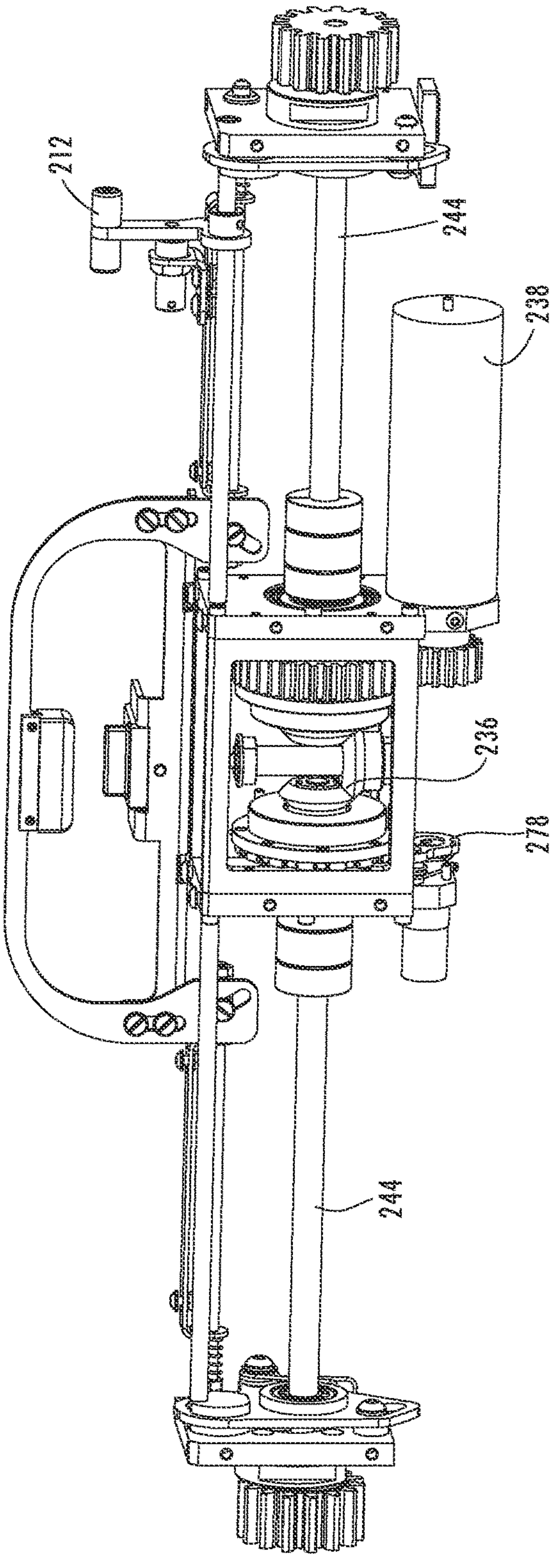
Figure 77:
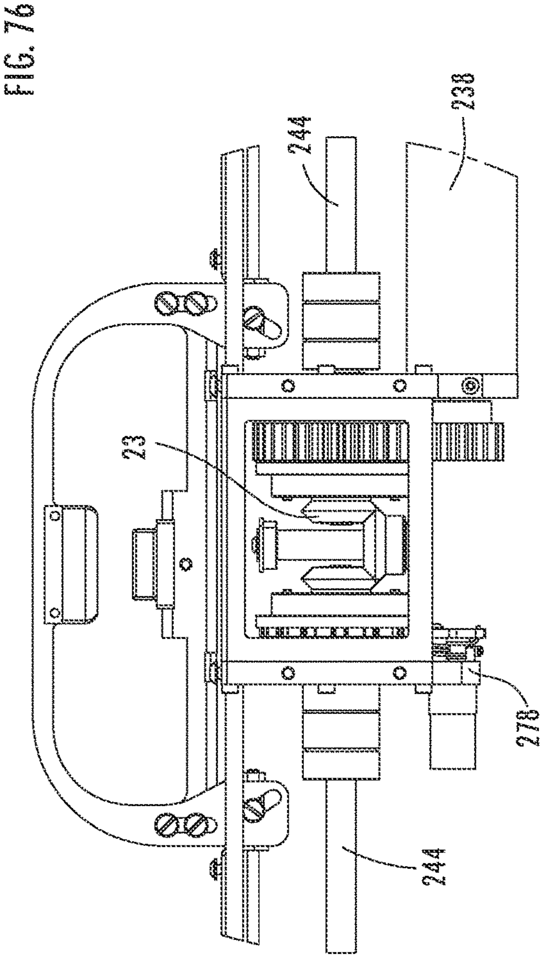

FIG. **72*a* is a cross-sectional view taken along lines AC-AC of FIG. 71** with the brake disengaged;

FIG. **72*b* is a cross-sectional view taken along lines AC-AC of FIG. 71** with the brake engaged;

FIG. 73 is bottom view of the drive components of an electrical power assistance device;

FIG. 74 is a perspective view of the partial sectional view taken along lines D-D of FIG. 73;

FIG. 75 is a partial view taken along lines F-F of FIG. 74;

FIG. 76 is a rear perspective view of the drive components of an electrical power assistance device;

FIG. 77 is a partial view of the drive components of an electrical power assistance device.

Figure 78:
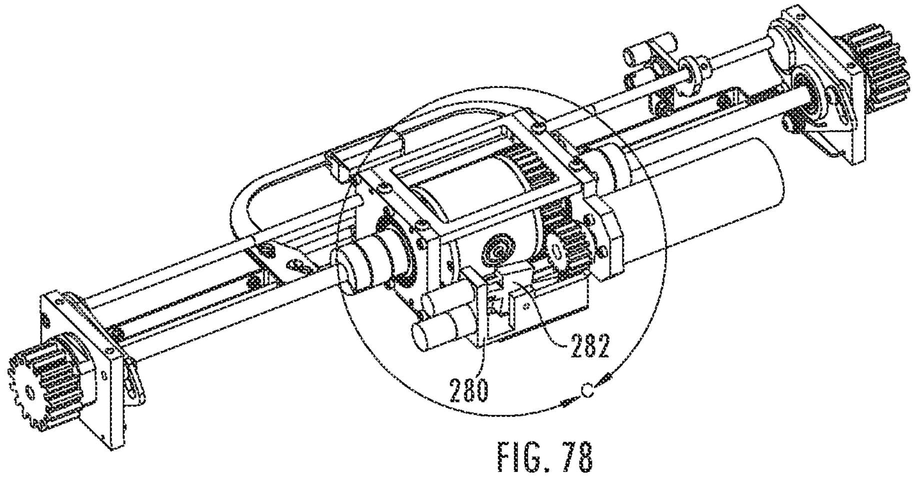
Figure 79:
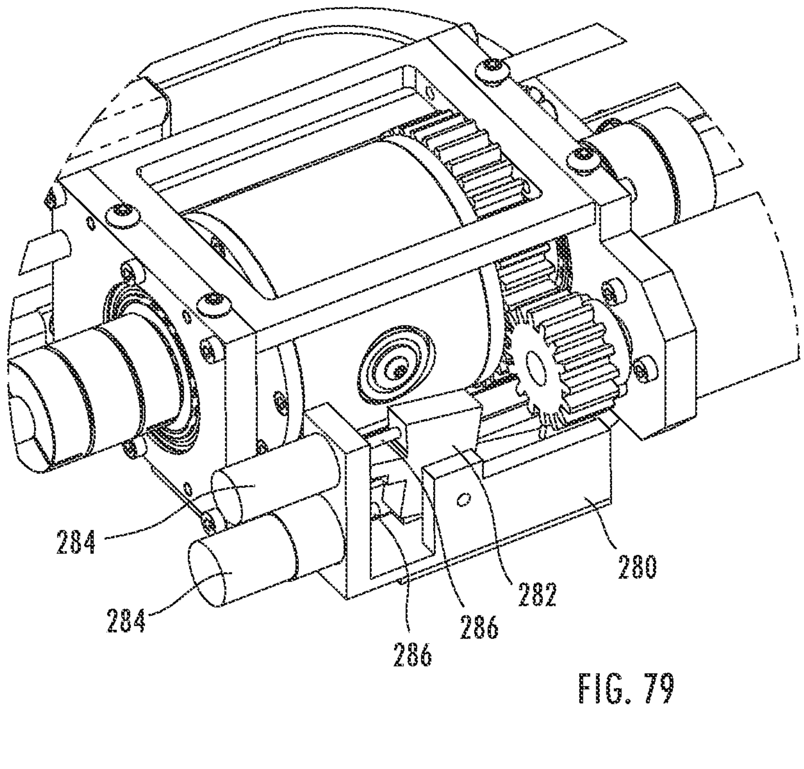
Figure 80:
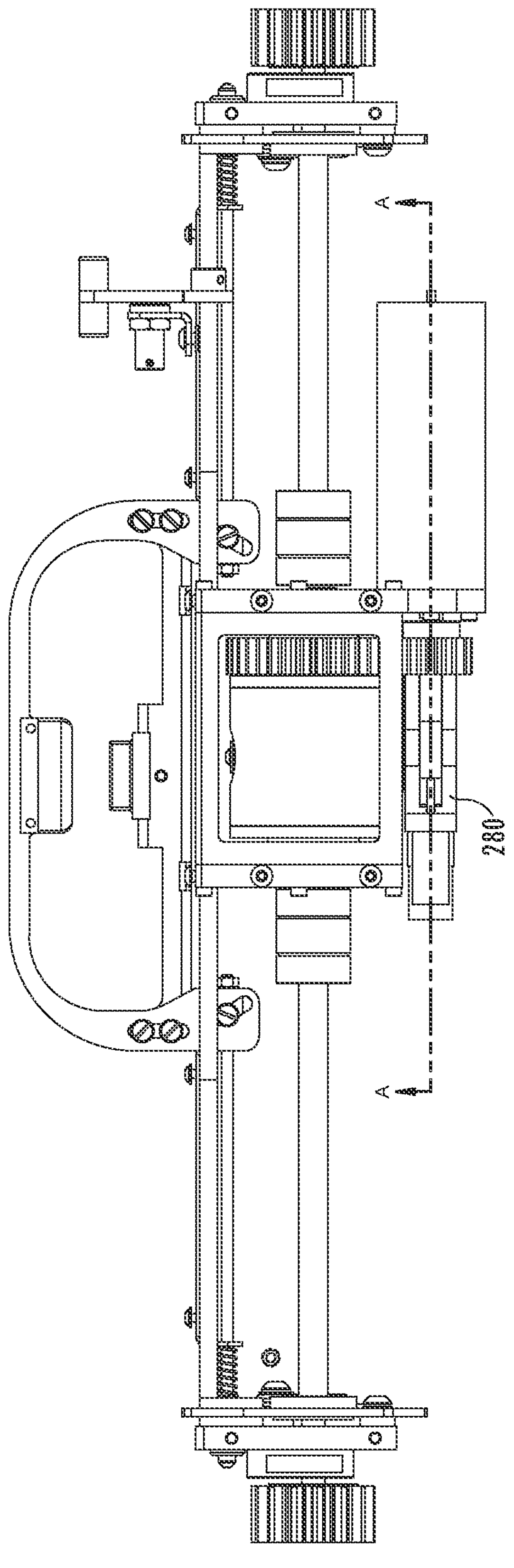
Figure 82:
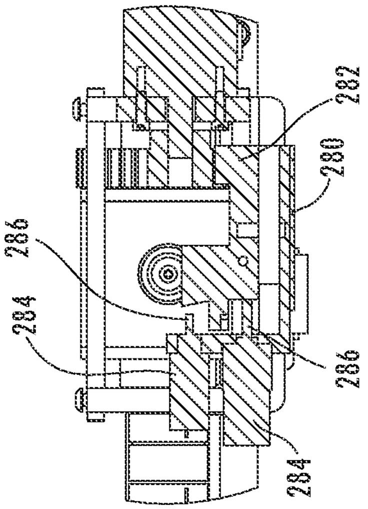
Figure 81:
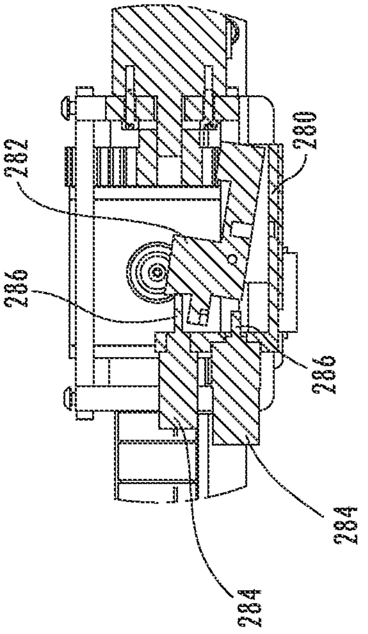
Figure 83:
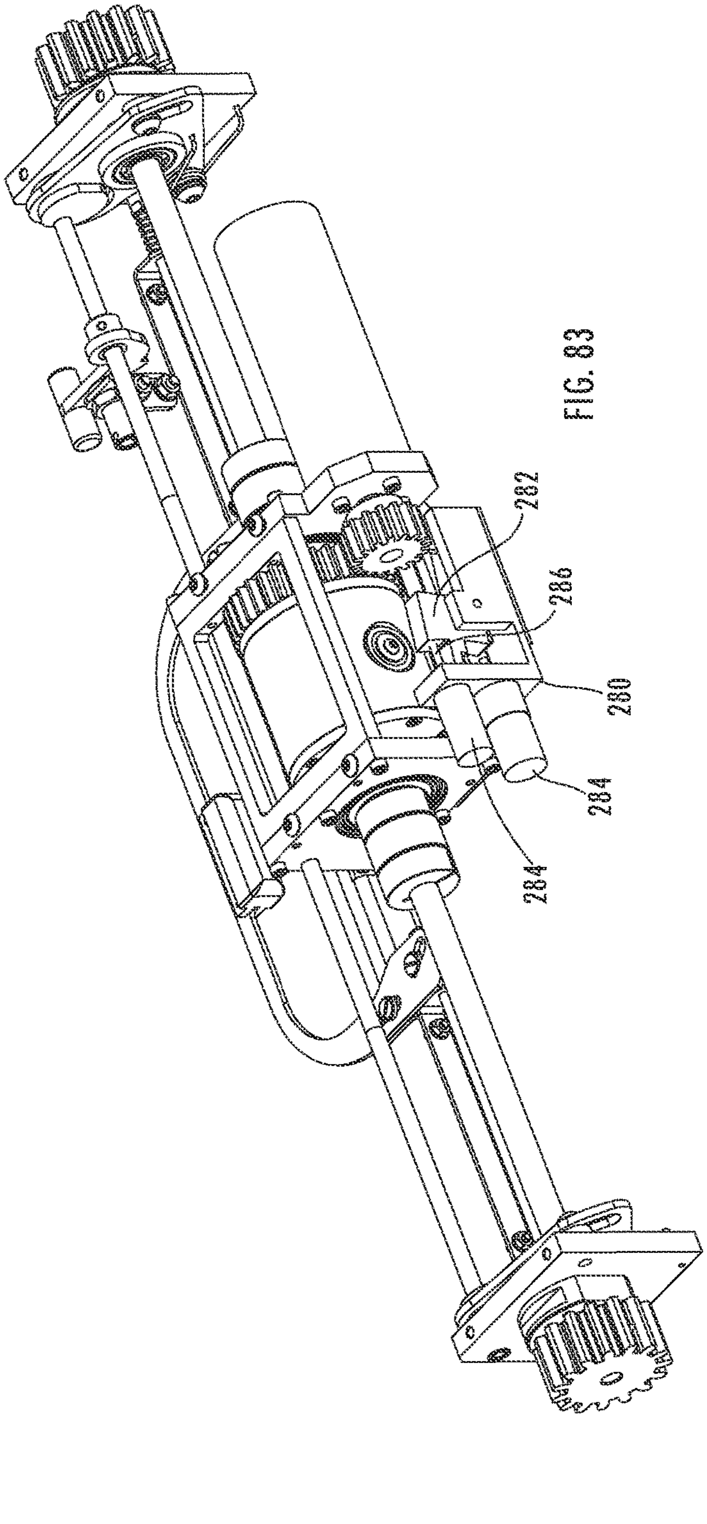
Figure 84:
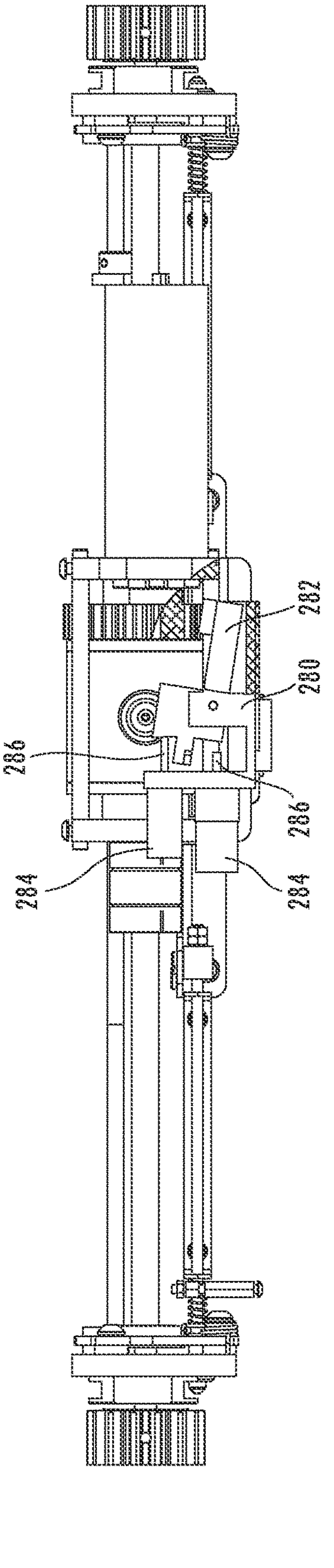

FIG. 78 is lower perspective view of the drive components of an electrical power assistance device with an emergency brake;

FIG. 79 is a partial view taken along lines C-C of FIG. 78;

FIG. 80 is a rear view of the drive components of an electrical power assistance device with an emergency brake;

FIG. 81 is a partial cross-sectional view taken along lines A-A of FIG. 80 showing the emergency brake in a disengaged position;

FIG. 82 is a partial cross-sectional view taken along lines A-A of FIG. 80 showing the emergency brake in the engaged position;

FIG. 83 is a lower perspective view of the drive components of an electrical power assistance device with emergency brake; and FIG. 84 is a bottom view of the drive components of an electrical power assistance device with emergency brake.

DETAILED DESCRIPTION OF THE INVENTION

FIGS. 1-14 illustrate an embodiment of the housing (12) of the electrical power assistance device (10) of the present invention. The present electrical power assistance device (10) is designed to be removably coupled to a conventional transport wheelchair (100) to provide electrical power assistance to a caregiver or escort transporting a person in the transport wheelchair (100).

The motor (14) and a motor control board are located inside the motor housing (15). When in operation, the motor (14) is powered by a rechargeable battery (16) located in a battery housing (17) and drives an internal drive shaft (18) which rotates a pair of friction wheels (20) that are frictionally engaged with the wheels (102) of a transport wheelchair (100) to provide electrical power assistance for transportation. The motor housing (15) includes one end of a releasable electrical coupling (46) which connects through an electrical cable (32) to a controller (28).

To attach the electrical power assistance device (10) to the transport chair (100), the housing (12) has a pair of couplings (52) which releasably couple to corresponding frame couplings (48) which are attached to the frame (104) of the transport wheelchair (100). As shown in the figures, in this embodiment, the frame couplings (48) include a "T" shaped attachment protrusion (49) which engages with a recessed slot (53) in the housing coupling (52). To properly align the couplings (52, 48), a pair of positioning handles (40) are included so that the housing couplings (52) can be aligned to engage with the frame couplings (48). The housing couplings (52) can be provided with adjustable extensions to allow the electrical power assistance device (10) to couple to transport chairs (100) of different widths.

Once the housing (12) is properly seated and engaged with the frame couplings (48), a screw (or other fastener) (56) can secure the housing couplings (52) to the frame couplings (48). Once properly attached, the electrical power assistance device (10) can be turned on using a conventional type on/off switch (44), and the power setting can be adjusted using a power controller dial (36). A releasable electrical coupling (46) is used to connect the electrical cable (32), giving a caregiver or escort the ability to engage the motor using the controller (28). In the embodiment shown, the controller (28) is coupled to a handle (106) of the transport wheelchair (100) and operated using a trigger (30); however, other conventional methods are contemplated by this invention, such a thumb trigger or a twist throttle. Additionally, the controller (28) includes a switch (34) which changes the motor from operating to produce assistance in a forward direction or a reverse direction.

A clutch (22) is provided to engage and disengage the friction wheels (20) with the wheels (102) of the transport wheelchair (100). The clutch (22) is connected to an internal clutch axle (24). On each end of the clutch axle (24) is an eccentric disk (26) which functions to engage or disengage the friction wheels (20) with the wheels (102). The eccentric disks (26) are protected from the outside by a cover plate (58), which can be removed to allow access for maintenance.

For the motor (14) to produce rotational force on the drive shaft (18), a pair of gears (50) are included to convert rotational motion from the motor (14) into rotational motion of the drive shaft (18). Additionally, the drive shaft (18) is provided with a differential (236) to allow the transport chair (100) to turn more easily, without power being evenly applied to each wheel (102) while turning.

Because the friction wheels (20) will wear out over time, they are easily replaceable with minimal work. The housing (12) is also provided with a carrying handle (42) so that it can be easily carried once detached from the transport chair (100).

In a more preferred embodiment, the rechargeable batteries (16) that power the motor (14) are TSA-approved batteries so that the device is permitted on airplanes.

Figure 1:
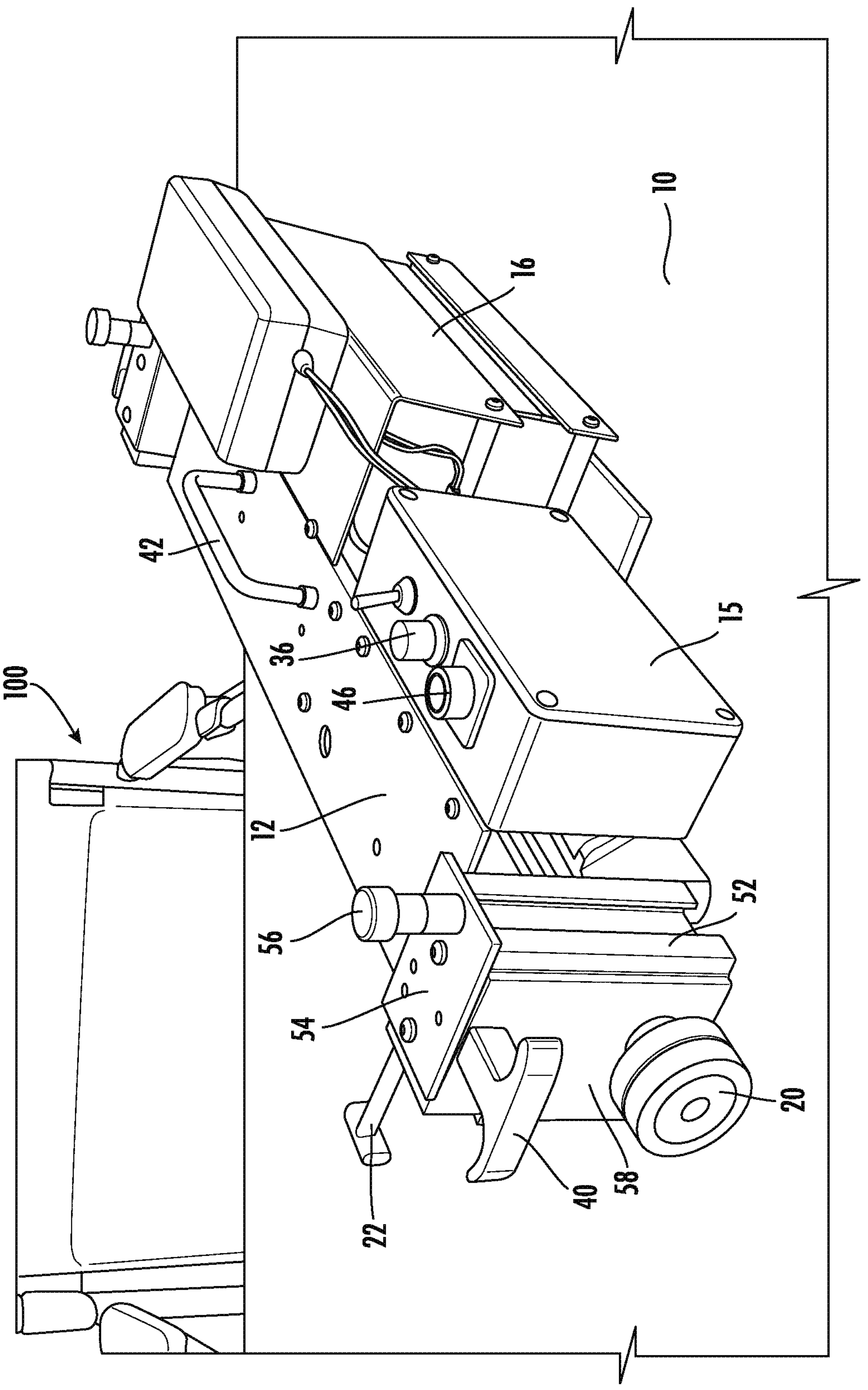
FIG. 1 is a perspective view of an embodiment of the housing of the electrical power assistance device of the present invention.
Figure 2:
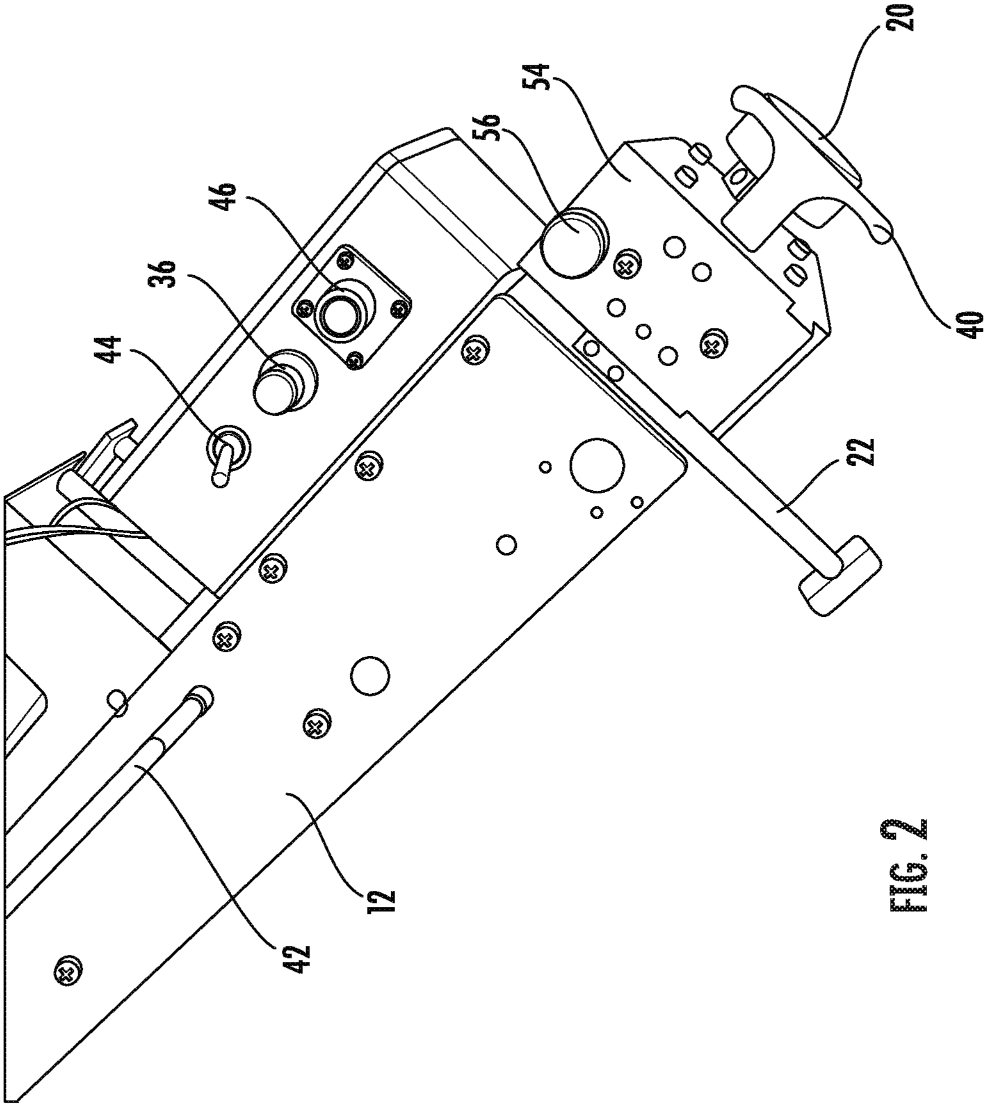
FIG. 2 is a top view of the right side of the embodiment of the housing of the electrical power assistance device of FIG. 1.
Figure 3:
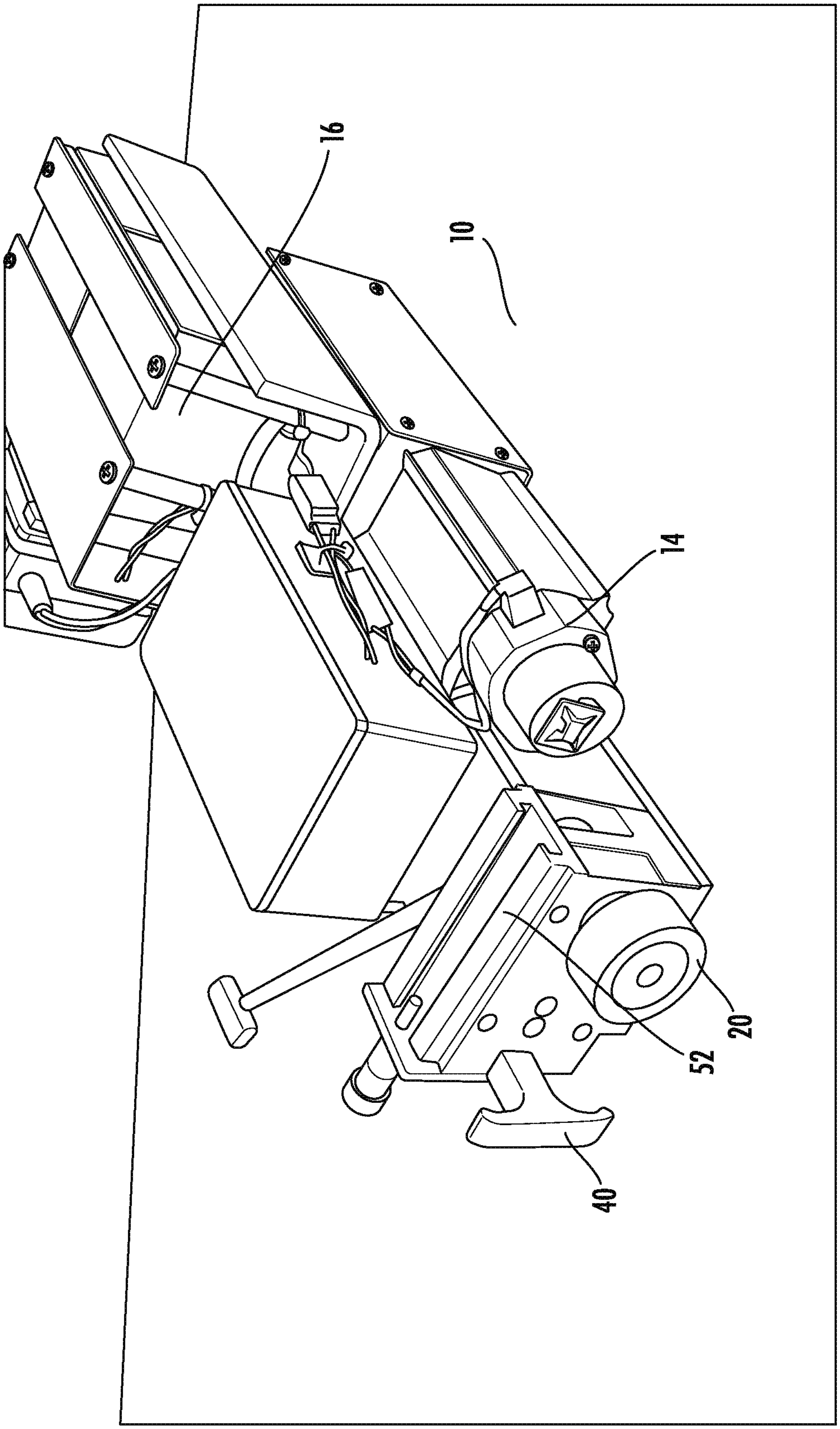
FIG. 3 is a bottom perspective view of the embodiment of the housing of the electrical power assistance device of FIG. 1.
Figure 4:
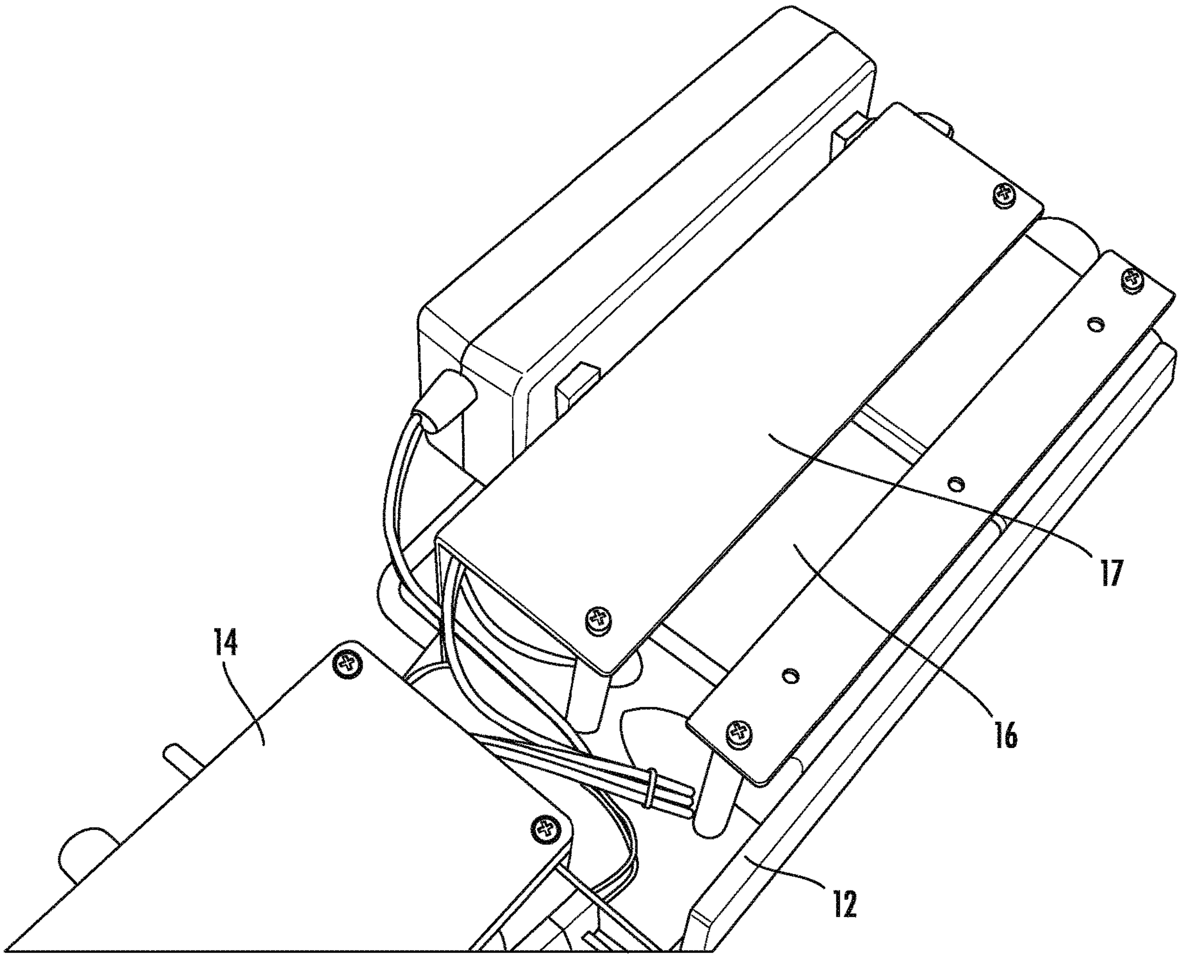
FIG. 4 is a perspective view of the battery compartment of the embodiment of the housing of the electrical power assistance device of FIG. 1.
Figure 5:
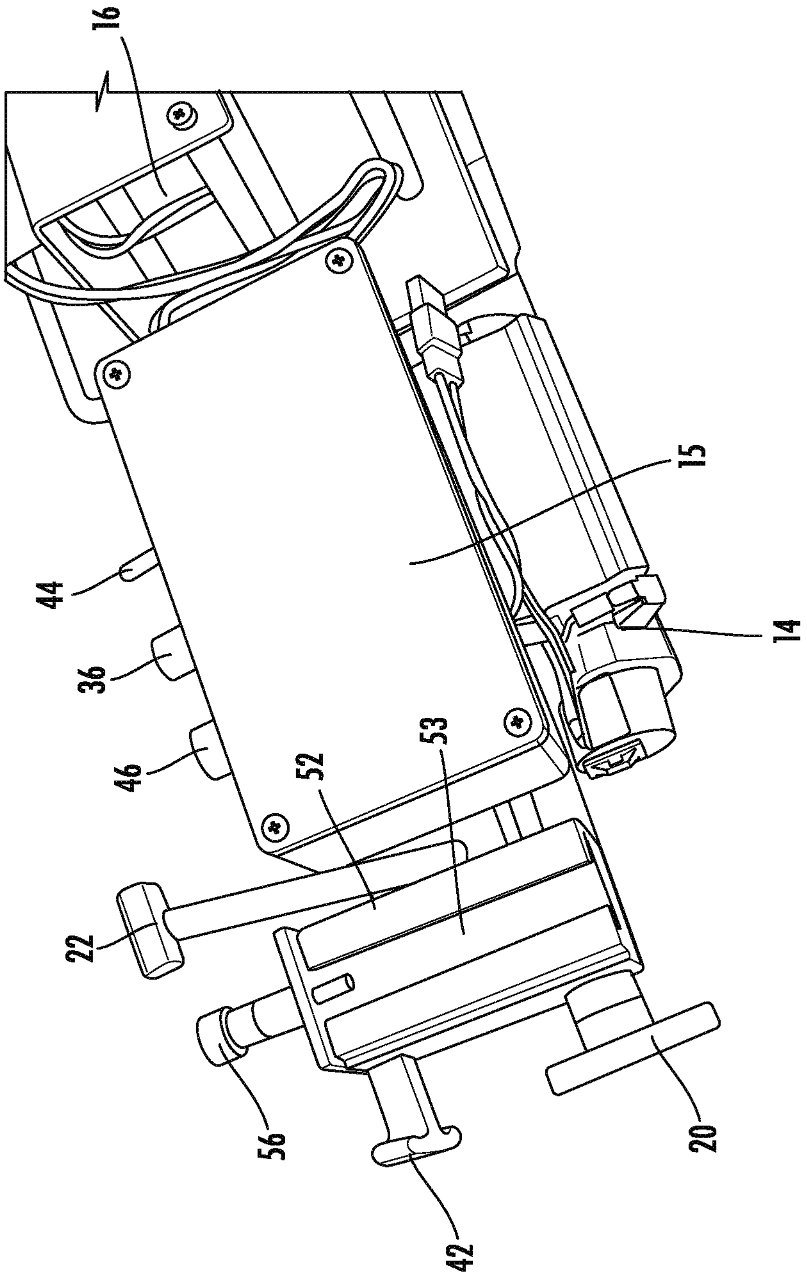
FIG. 5 is a front right perspective view of the embodiment of the housing of the electrical power assistance device of FIG. 1.
Figure 6:
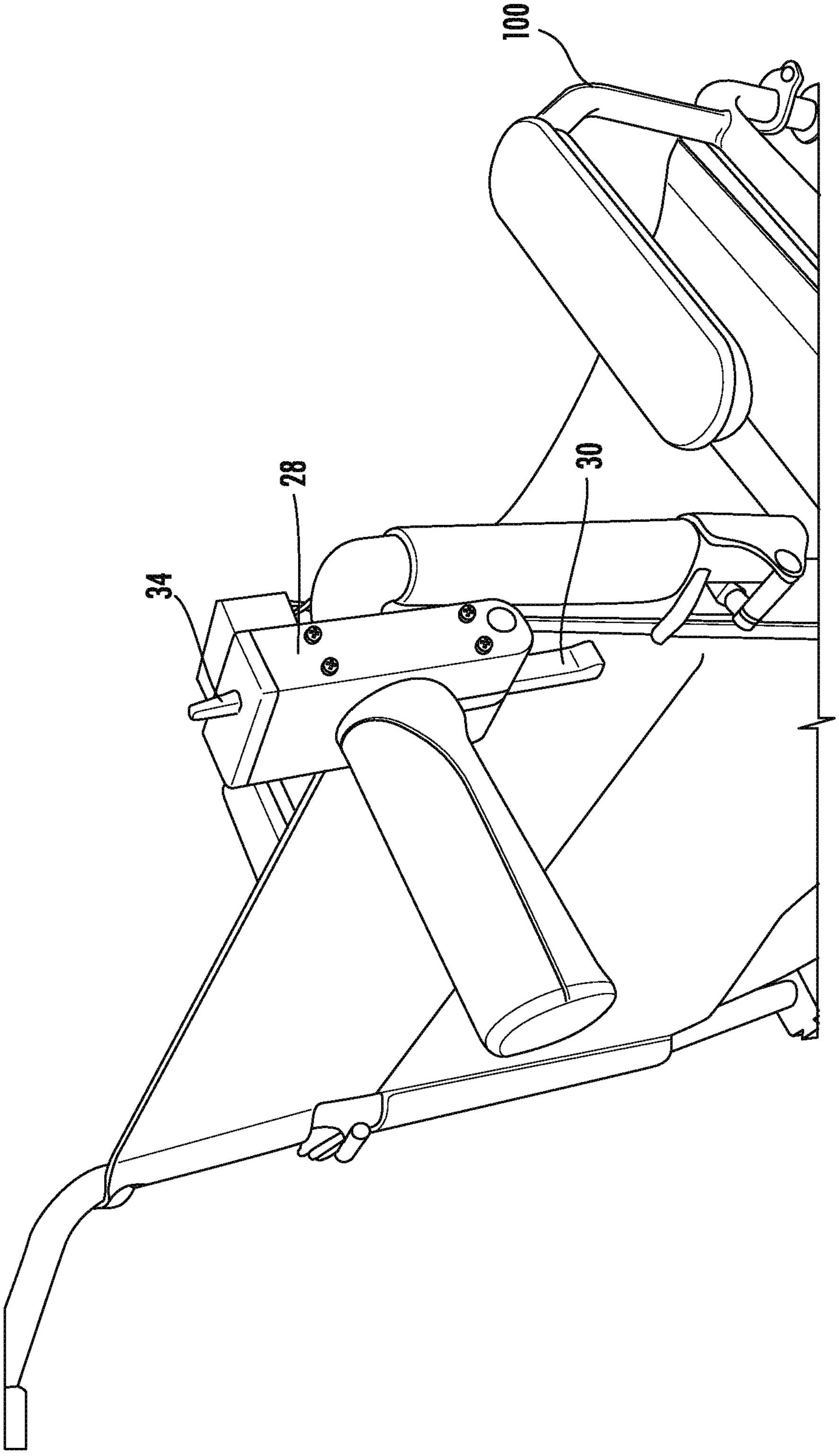
FIG. 6 is a perspective view of the controller of the embodiment of the electrical power assistance device of FIG. 1.
Figure 7:
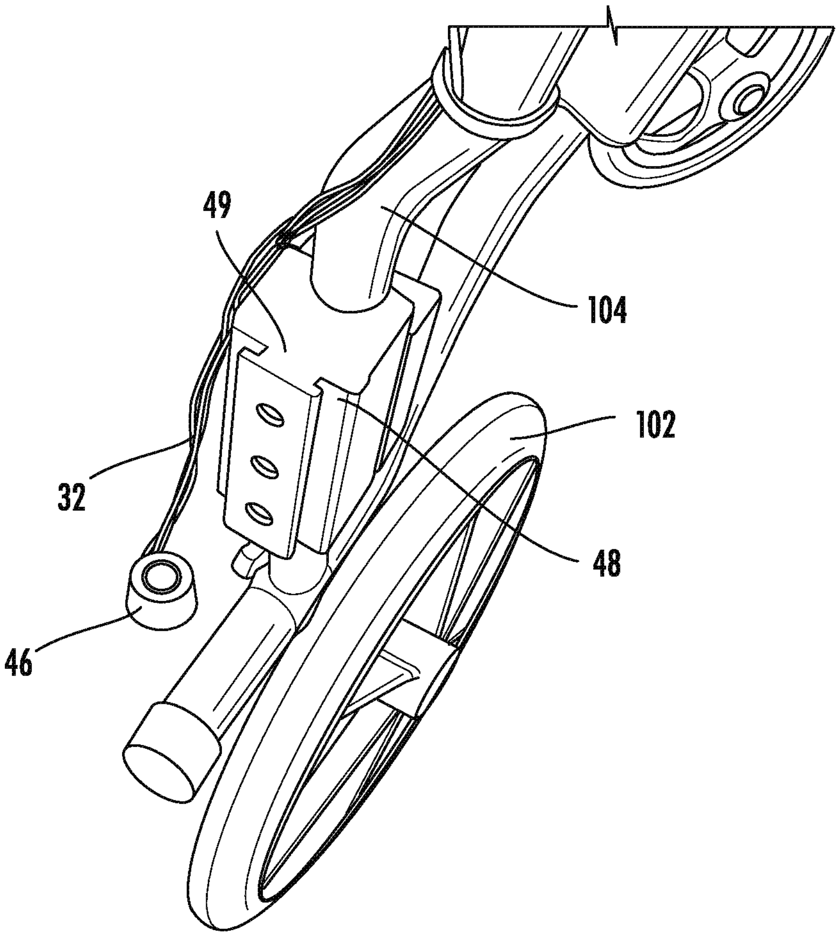
FIG. 7 is a perspective view of the mechanical coupling of the embodiment of the housing of the electrical power assistance device of FIG. 1 to the frame of a transport wheelchair and the electrical coupling to the controller.
Figure 8:
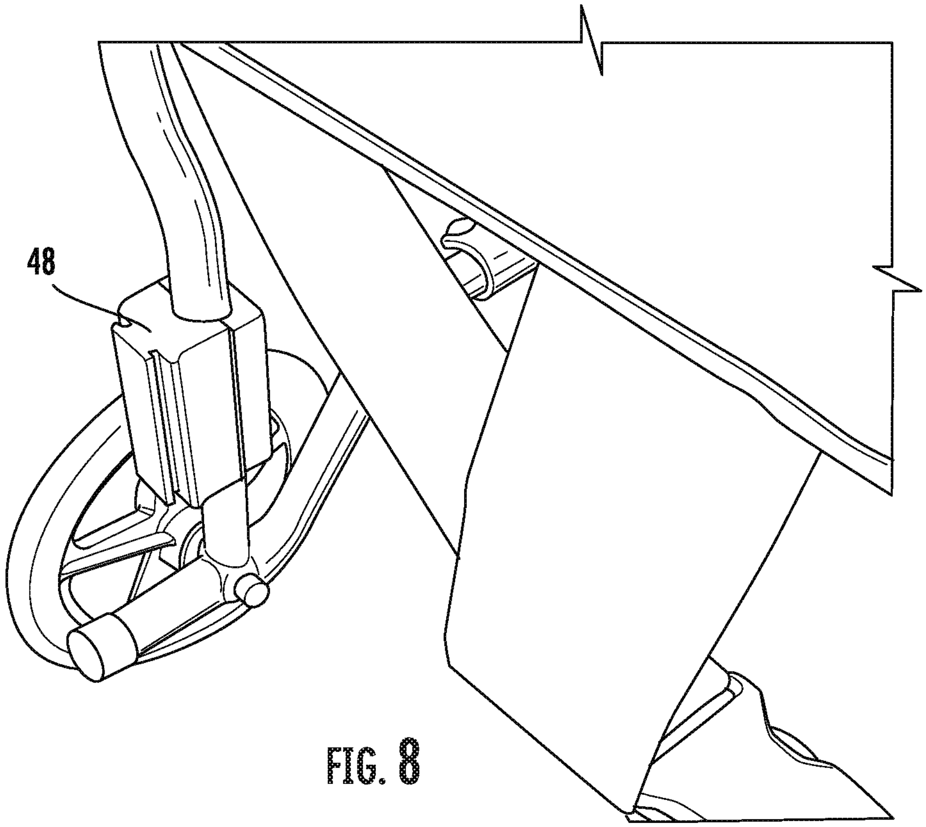
FIG. 8 is a perspective view of the second mechanical coupling of the embodiment of the housing of the electrical power assistance device of FIG. 1.
Figure 9:
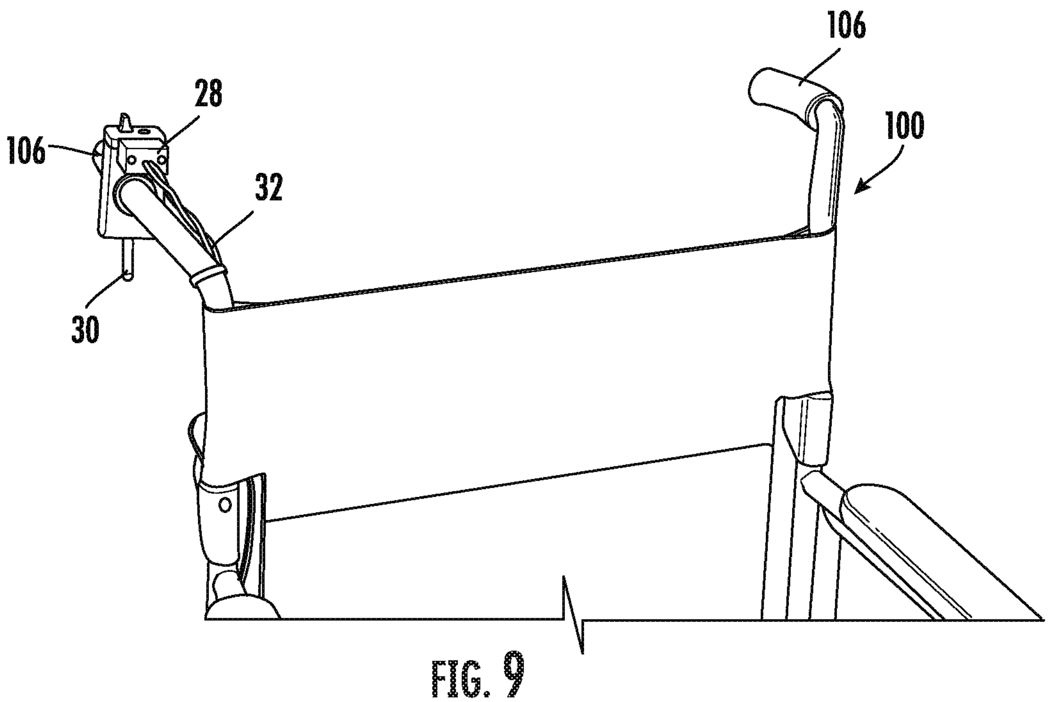
FIG. 9 is a front perspective view of the transport wheelchair with the controller of the embodiment of the electrical power assistance device of FIG. 6.
Figure 10:
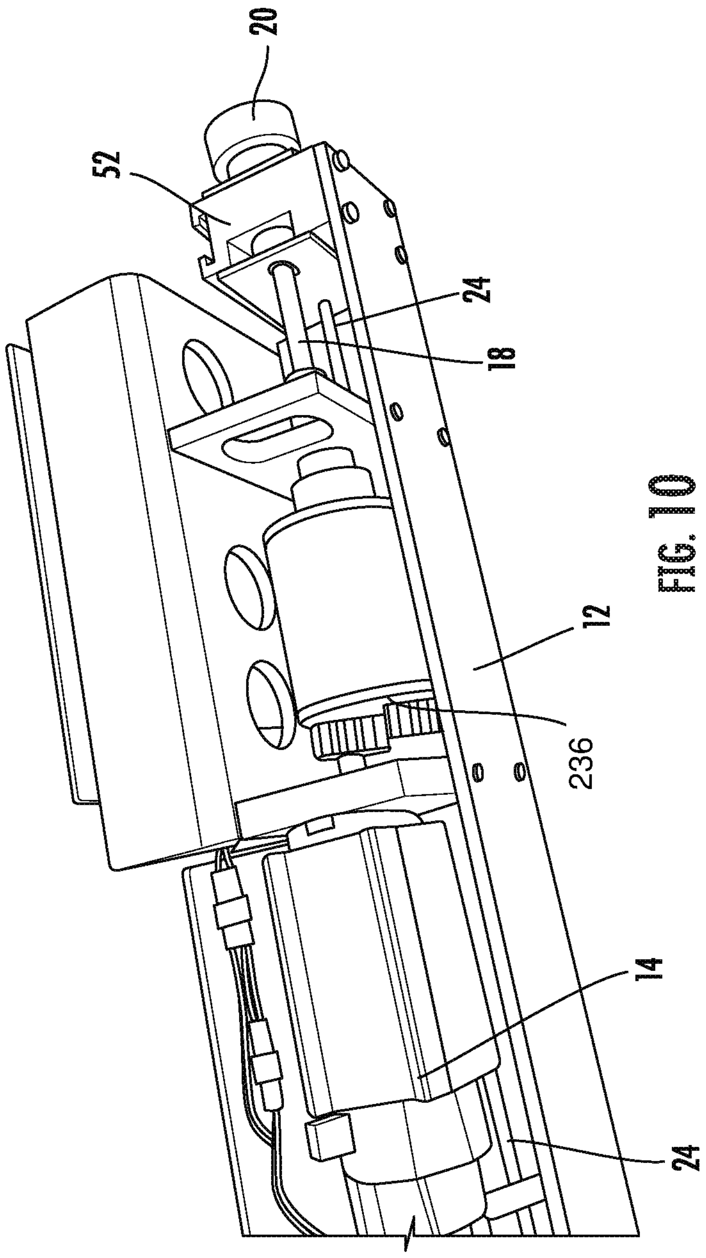
FIG. 10 is an internal view of the housing of the embodiment of the electrical power assistance device of FIG. 1, showing the motor, differential, drive shaft, and clutch axle.
Figure 11:
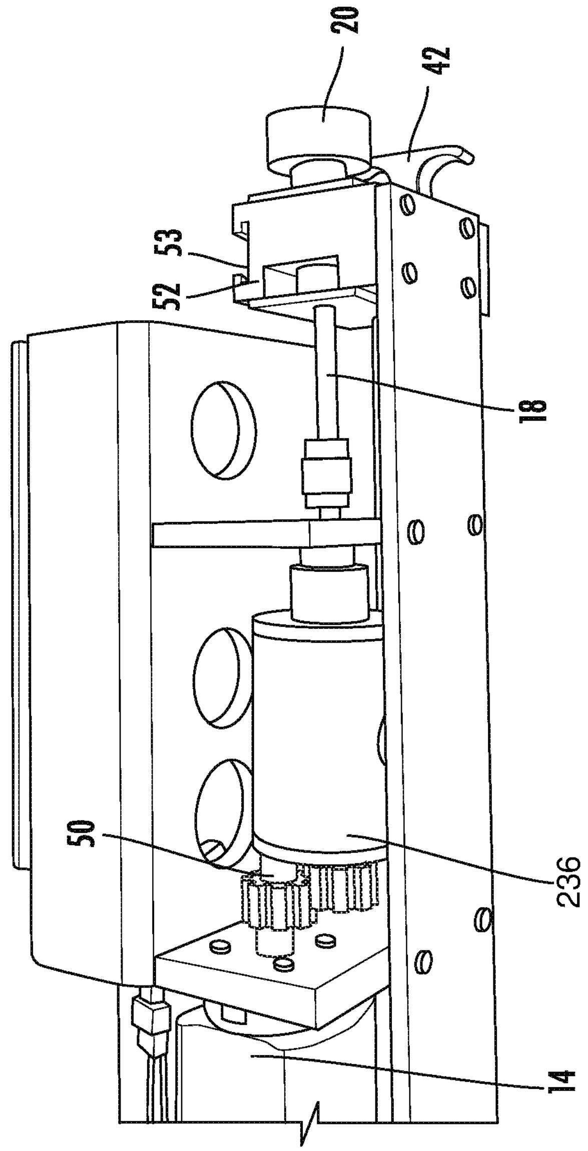
FIG. 11 is a front view of the housing of FIG. 10.
Figure 12:
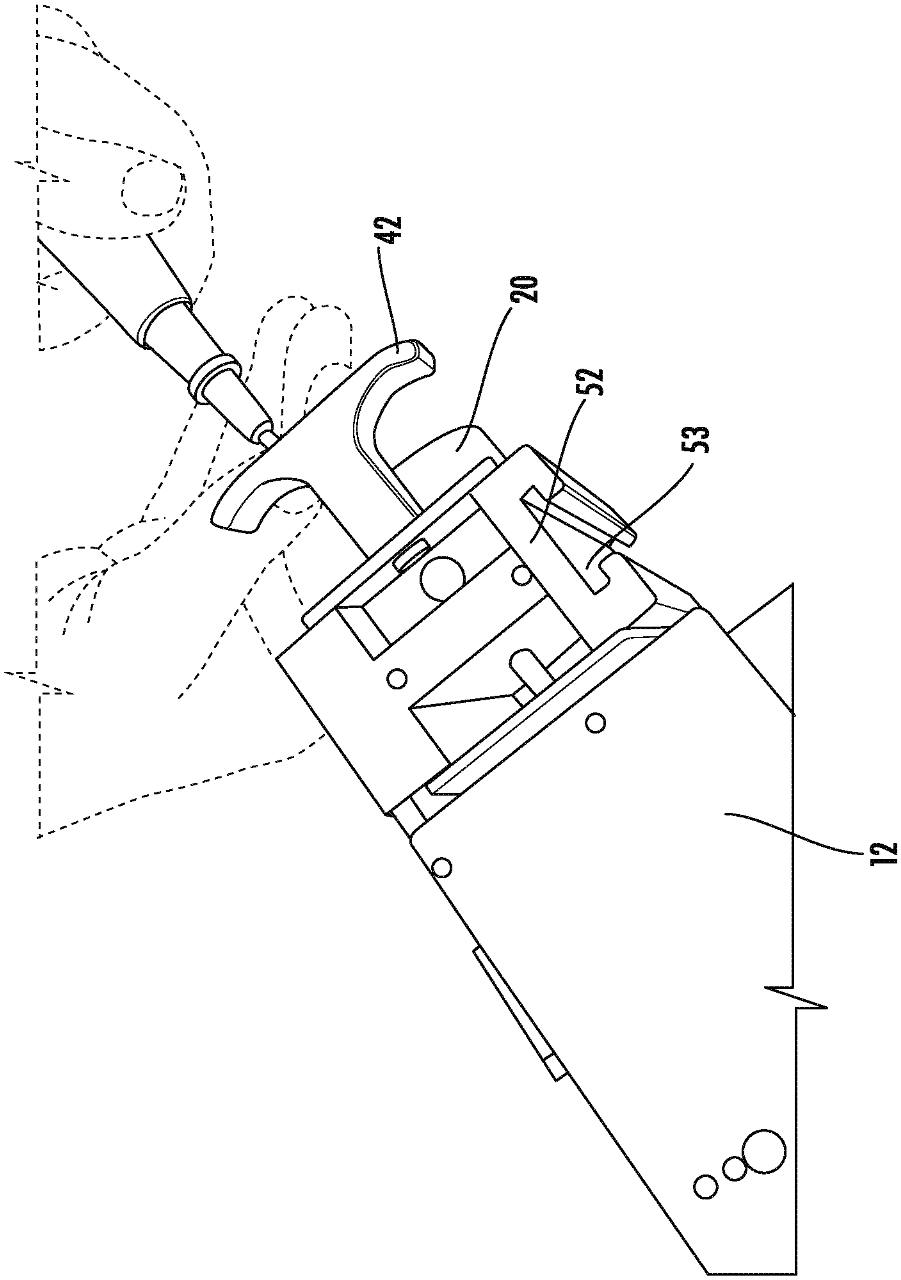
FIG. 12 is a top view of the left side of the housing of FIG. 1.
Figure 13:
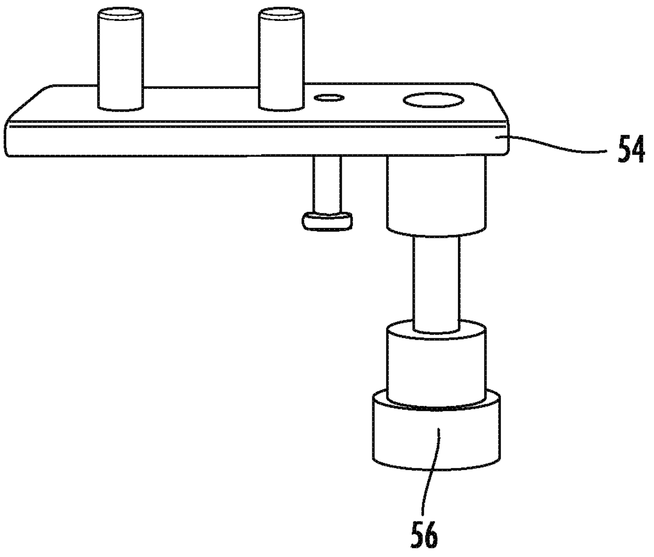
FIG. 13 is a perspective view of the top cover of the housing of the embodiment of the electrical power assistance device of FIG. 1.
Figure 14:
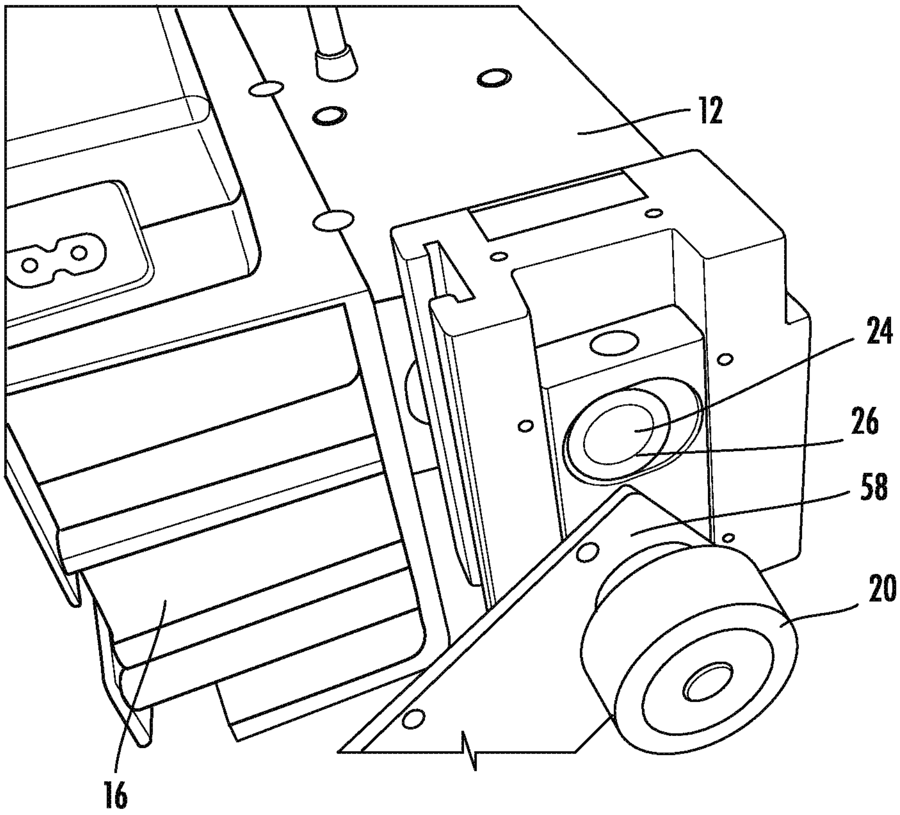
FIG. 14 is a side perspective view of the embodiment of the electrical power assistance device of FIG. 1 with a cover plate removed to show the eccentric disk for operating the clutch.
Figure 15:
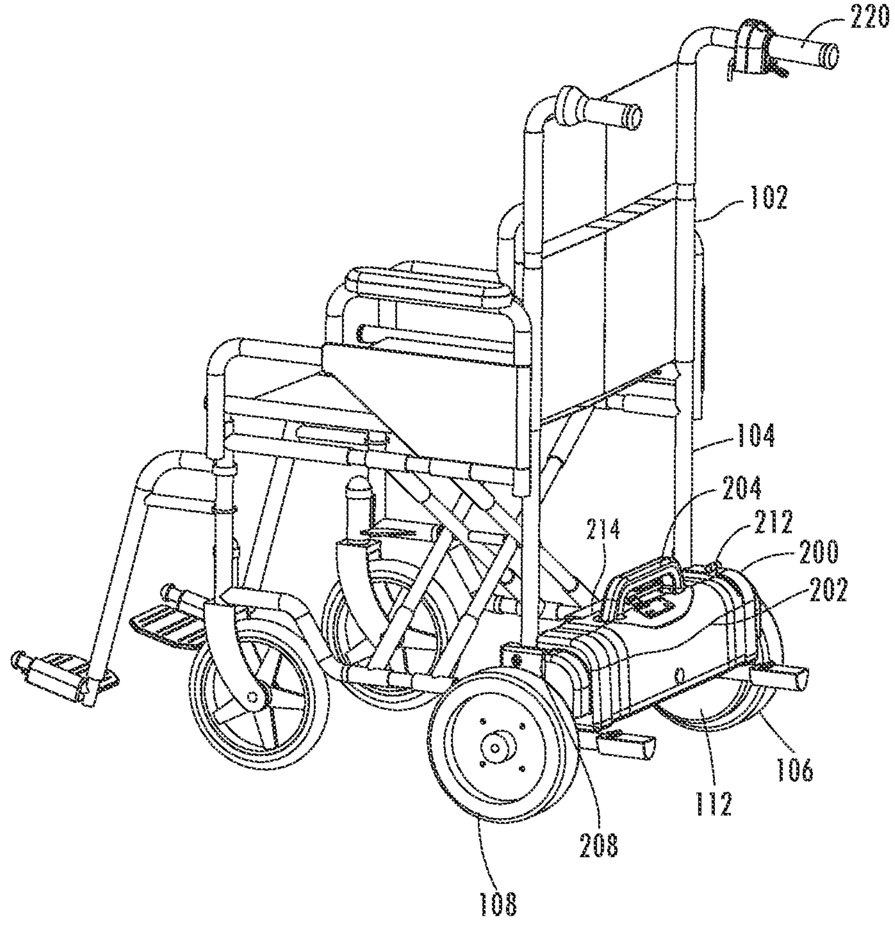
FIG. 15 is a rear perspective view of one embodiment of the electrical power assistance device secured to a wheeled chair.
Figure 16:
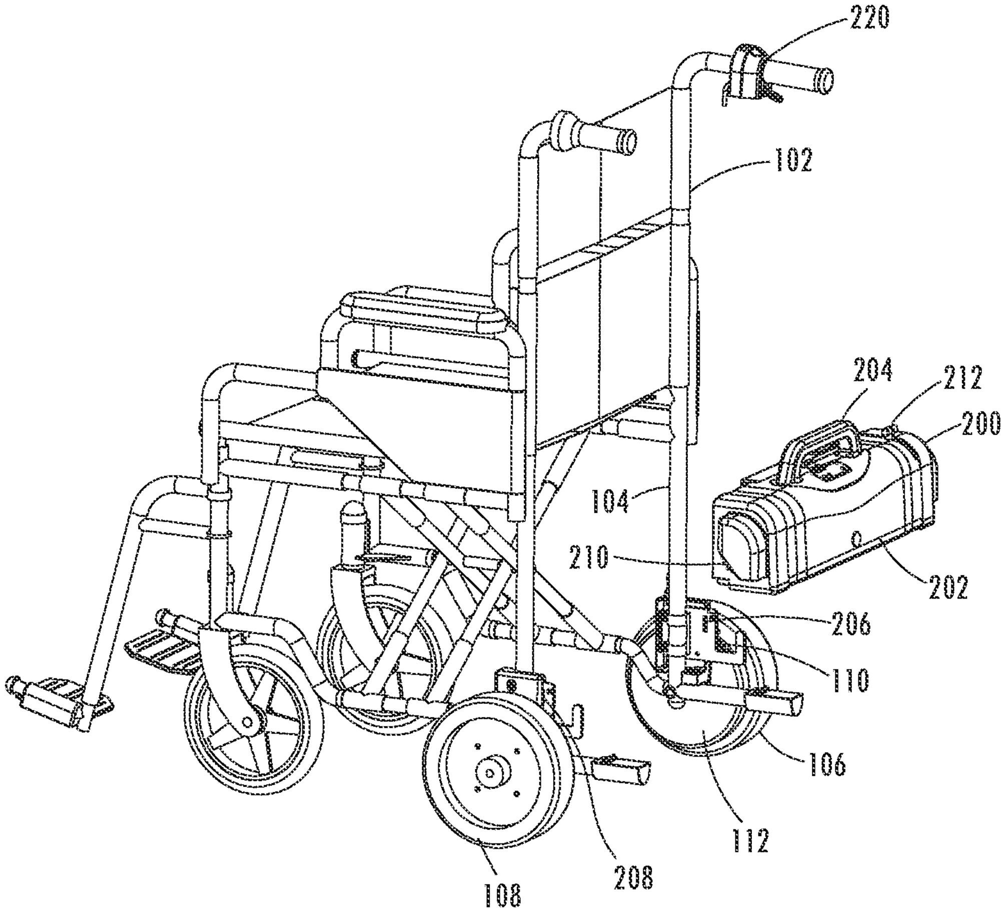
FIG. 16 is a rear perspective view of the embodiment of FIG. 15 illustrating removal of the electrical power assistance device from the wheeled chair.
Figure 17:
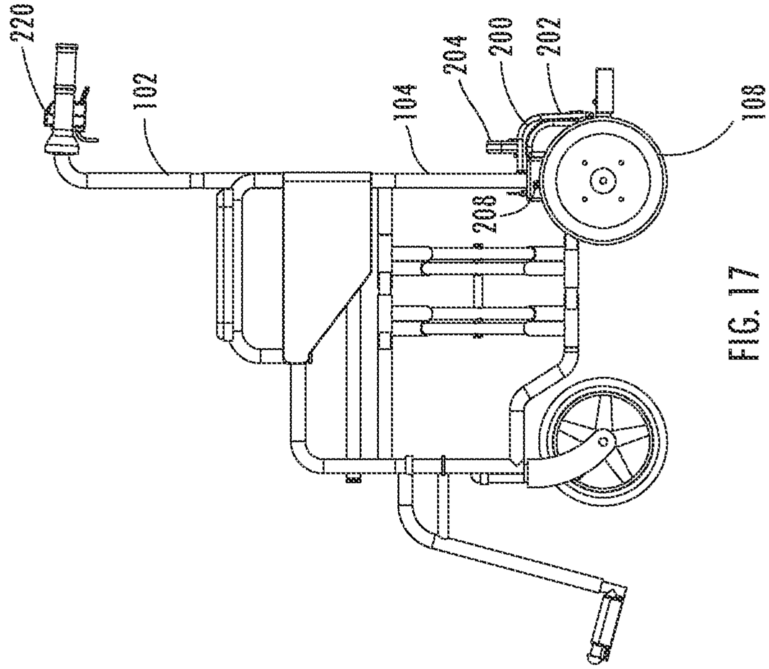
FIG. 17 is a left side view of the wheeled chair in combination with the electrical power assistance device secured.
Figure 18:
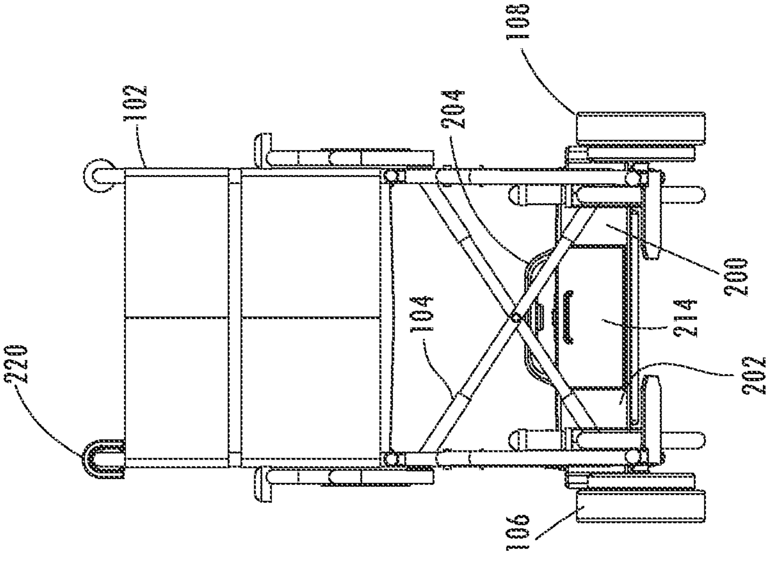
FIG. 18 is a front view of the embodiment shown in FIG. 17.
Figure 19:
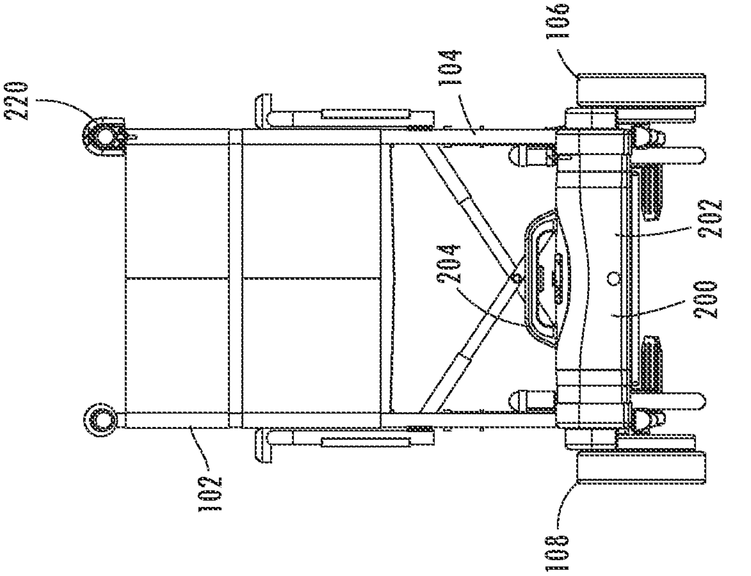
FIG. 19 is a rear view of the embodiment shown in FIG. 17.
Figure 20:
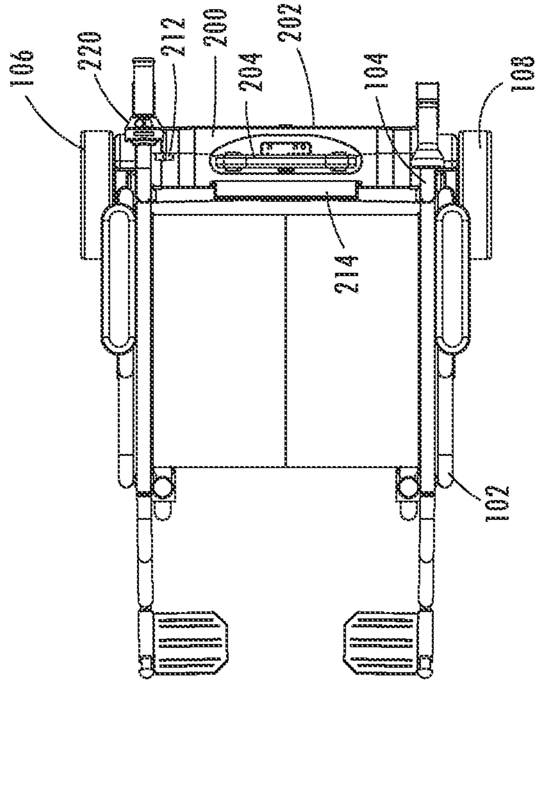
FIG. 20 is a top view of the embodiment shown in FIG. 17.
Figure 21:
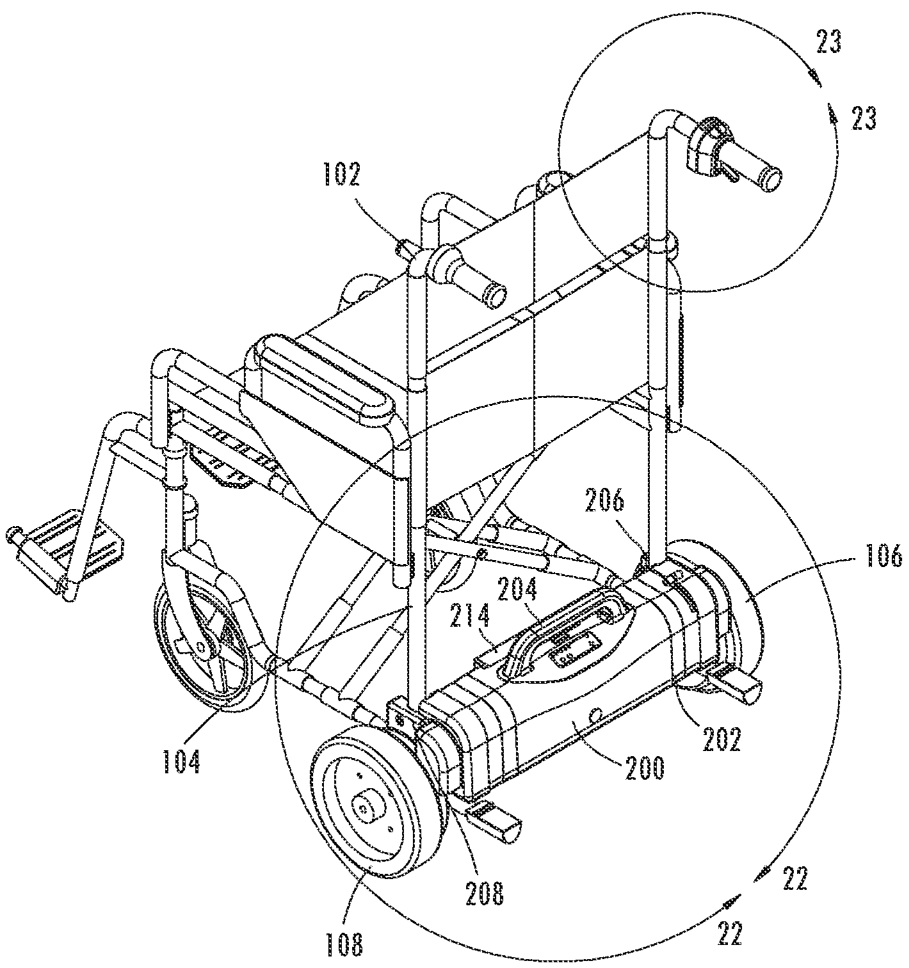
FIG. 21 is a rear perspective view illustrating the electrical power assistance device and its associated hand control.
Figure 23:
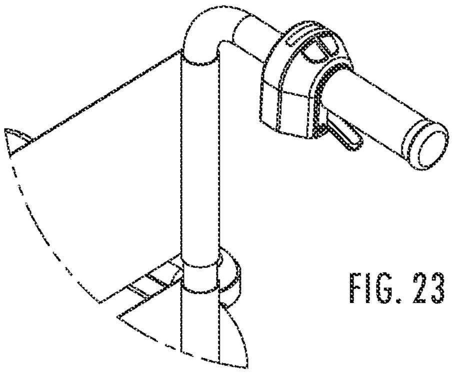
FIG. 23 is a partial view taken along lines 23-23 of FIG. 21.
Figure 22:
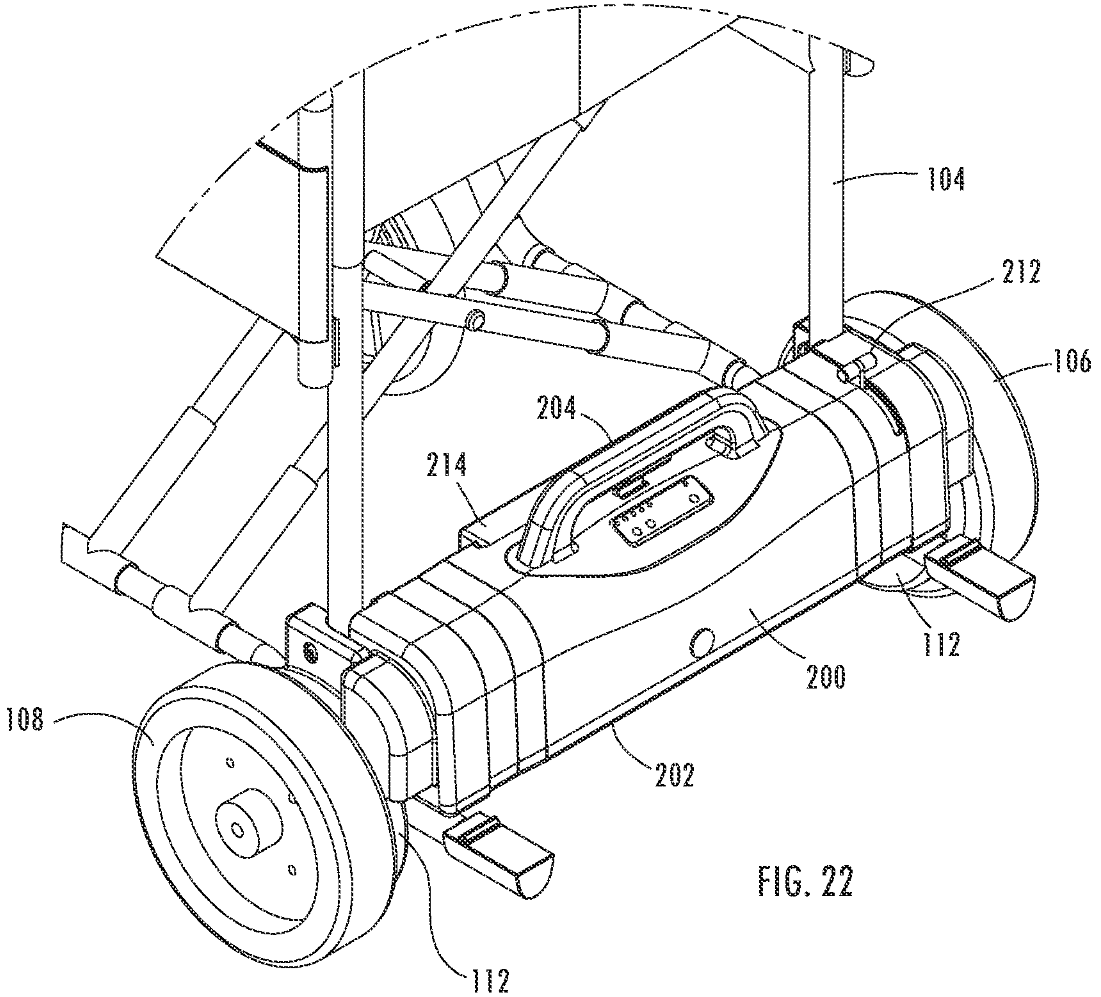
FIG. 22 is a partial view taken along lines 22-22 of FIG. 21.
Figure 24:
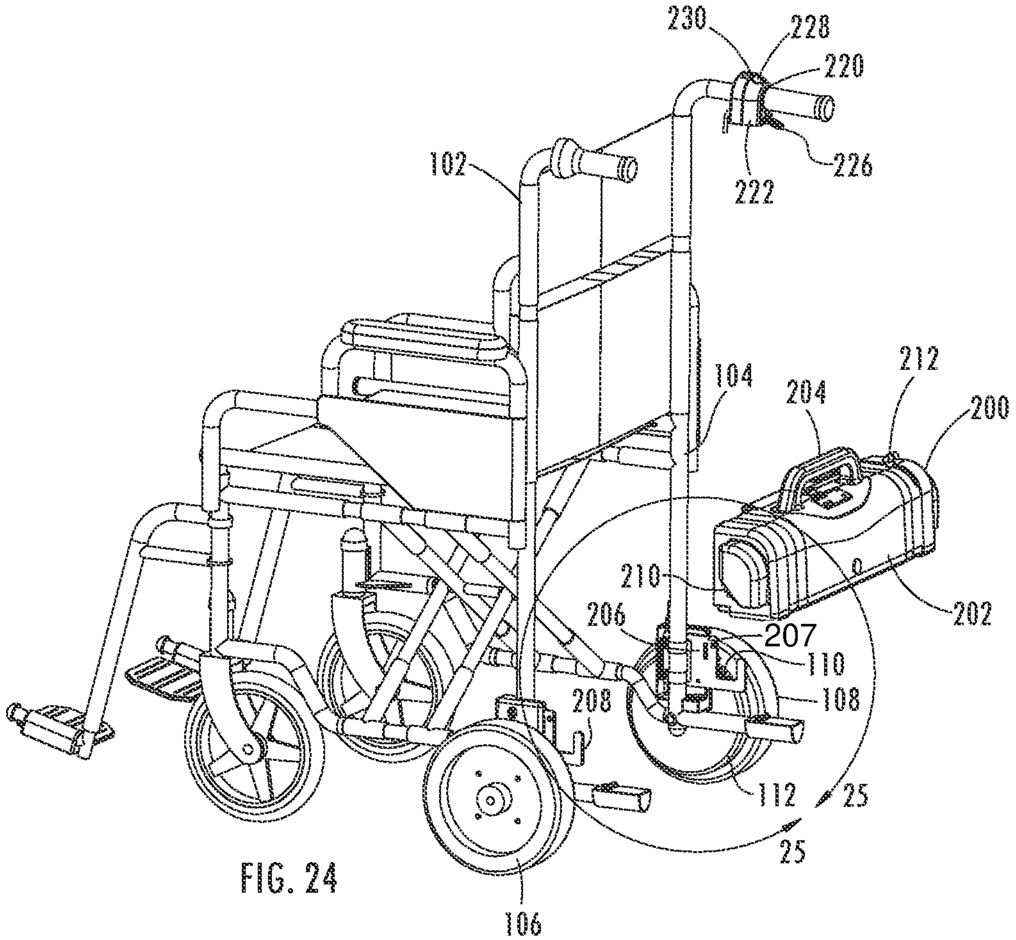
FIG. 24 is a rear perspective view illustrating the attachment brackets for the electrical power assistance device.
Figure 25:
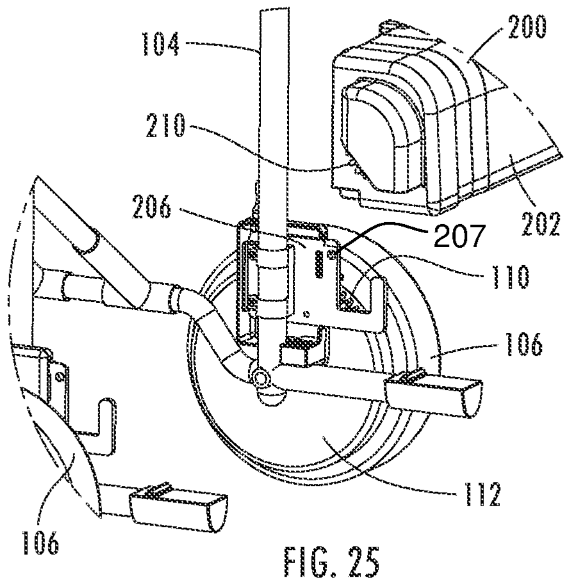
FIG. 25 is a partial view taken along lines 25-25 of FIG. 24.
Figure 26:
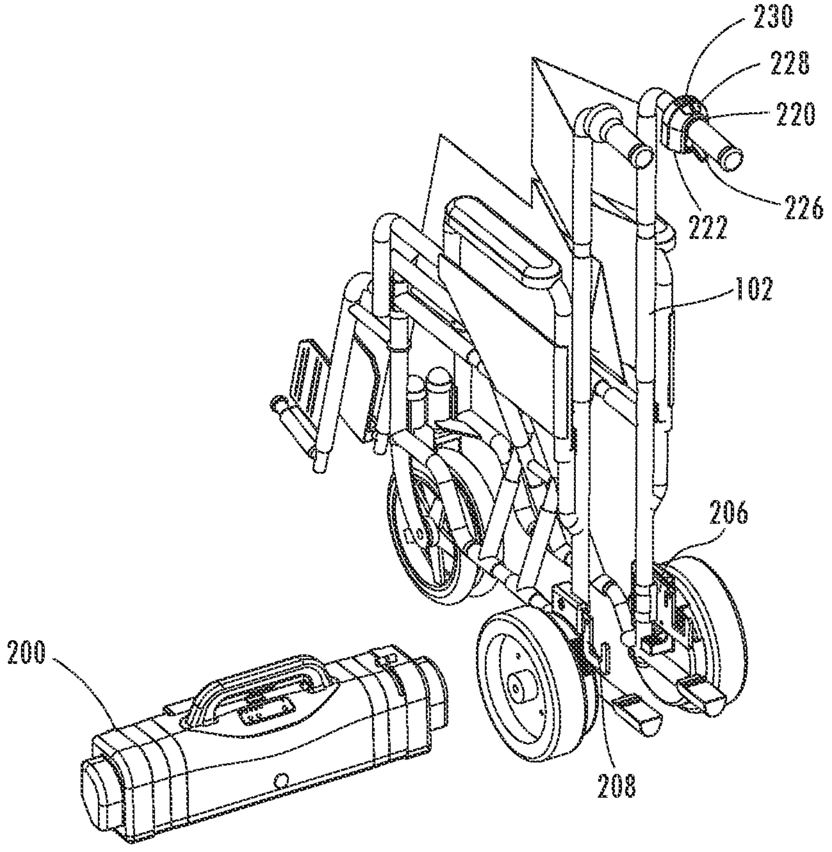
FIG. 26 is a rear perspective view illustrating the removed electrical power assistance device and the folded wheeled chair for storage or transport.
Figure 27:
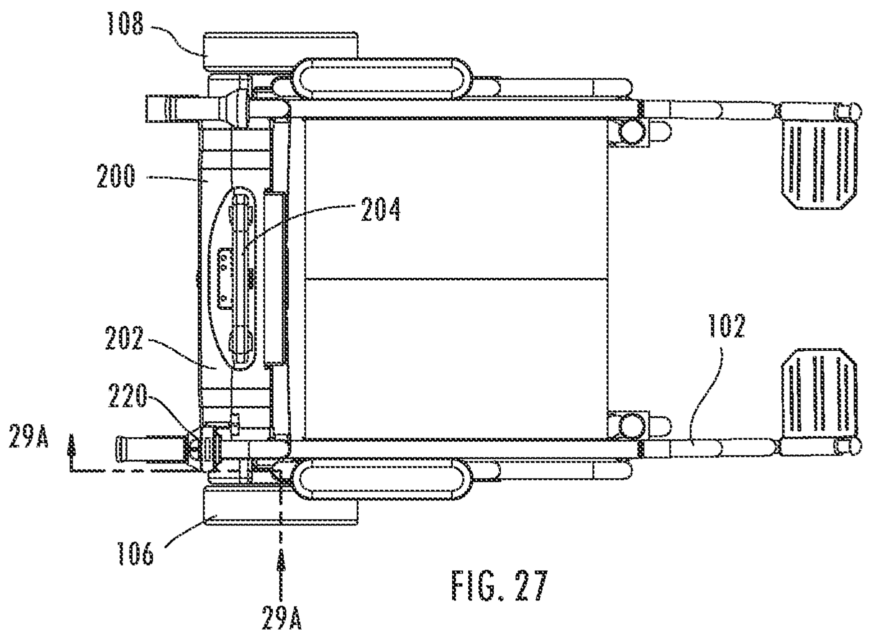
FIG. 27 is a top view of the wheeled chair with the electrical power assistance device.
Figure 28:
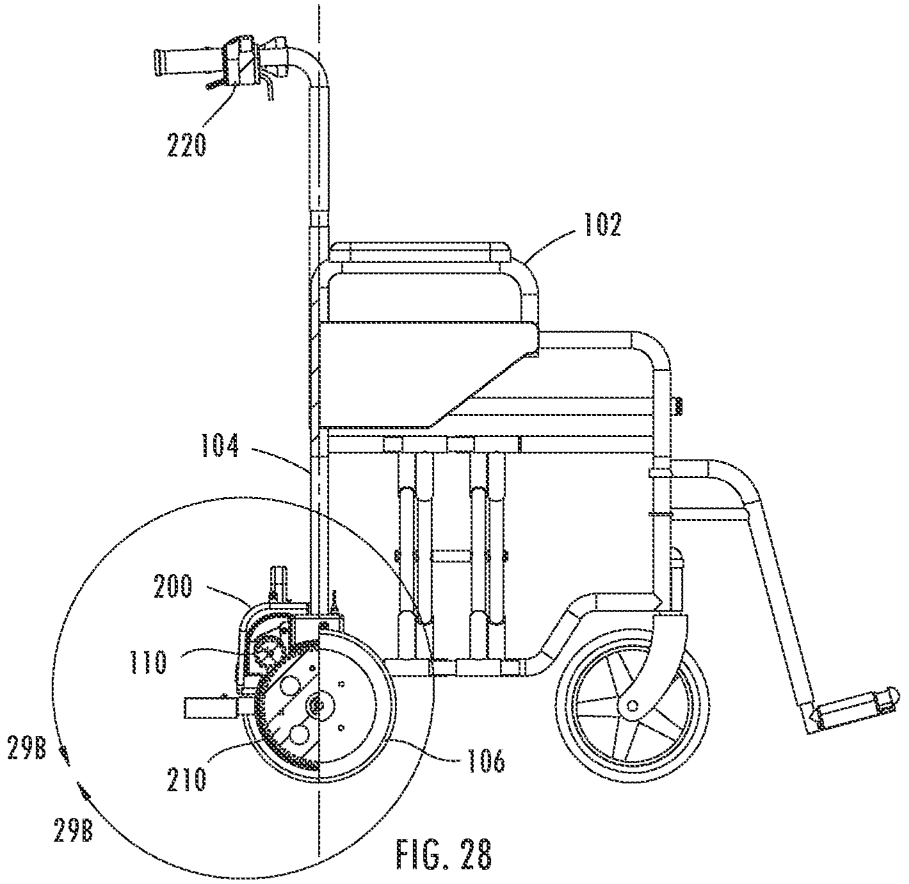
FIG. 28 is a right side view of the wheeled chair with the electrical power assistance device both partially in section, taken along lines 29A-29A of FIG. 27.
Figure 29:
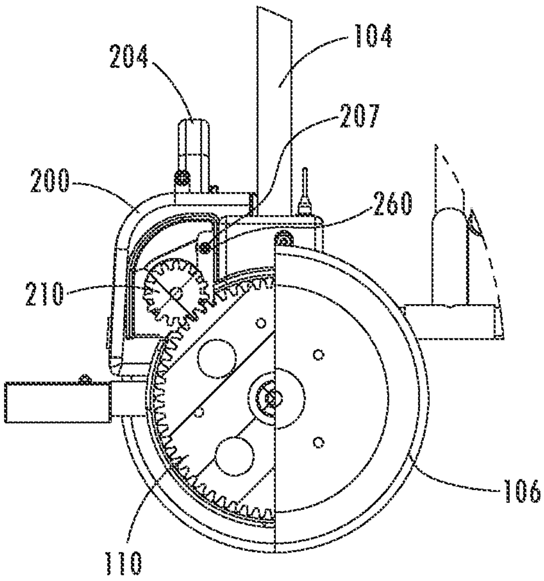
FIG. 29 is a partial view taken along lines 29B-29B of FIG. 28.
Figure 30:
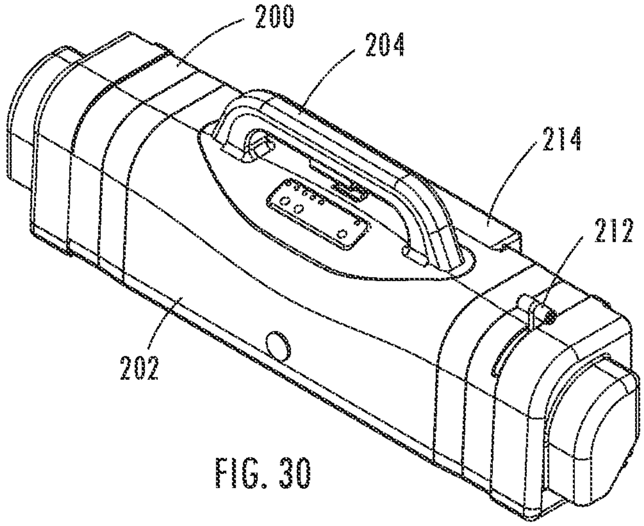
FIG. 30 is a top rear right perspective view of one embodiment of the electrical power assistance device.
Figure 31:
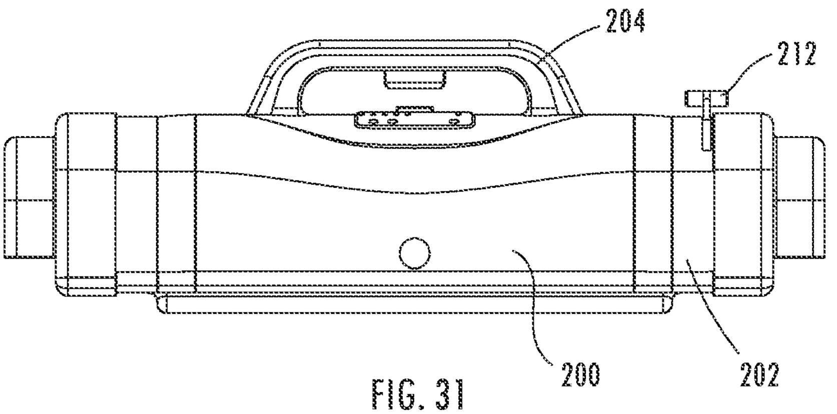
FIG. 31 is a rear view of the electrical power assistance device of FIG. 30.
Figure 32:
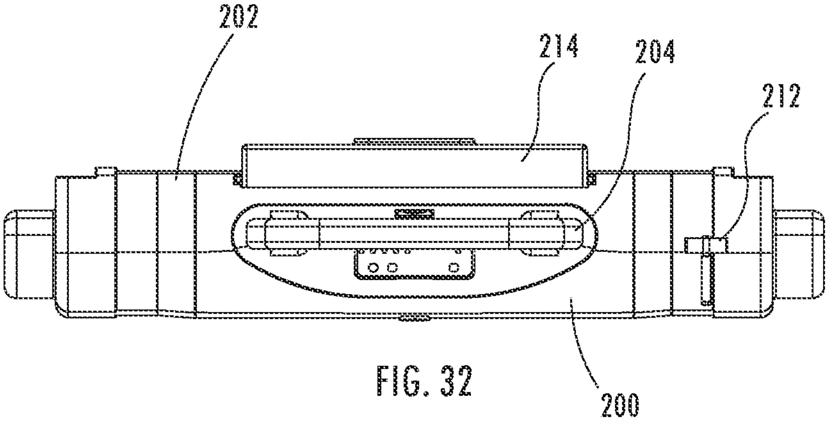
FIG. 32 is a top view of the electrical power assistance device of FIG. 30.
Figure 33:
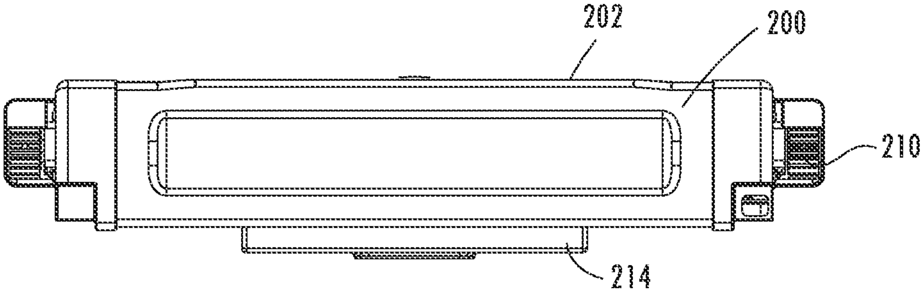
FIG. 33 is a bottom view of the electrical power assistance device of FIG. 30.
Figure 34:
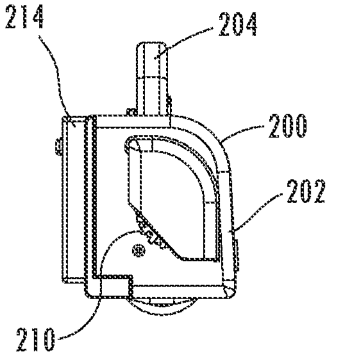
FIG. 34 is a left side view of the electrical power assistance device of FIG. 30.
Figure 35:
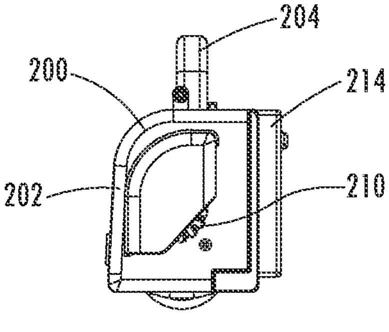
FIG. 35 is a right side view of the electrical power assistance device of FIG. 30.
Figure 36:
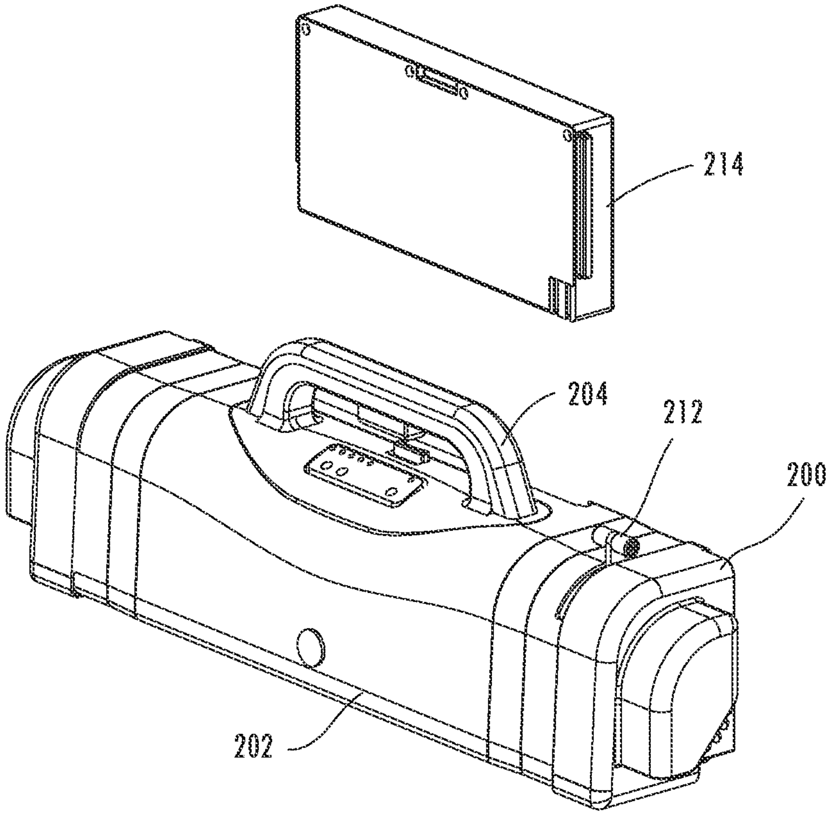
FIG. 36 is a top right rear perspective view of the electrical power assistance device of FIG. 30.
Figure 37:
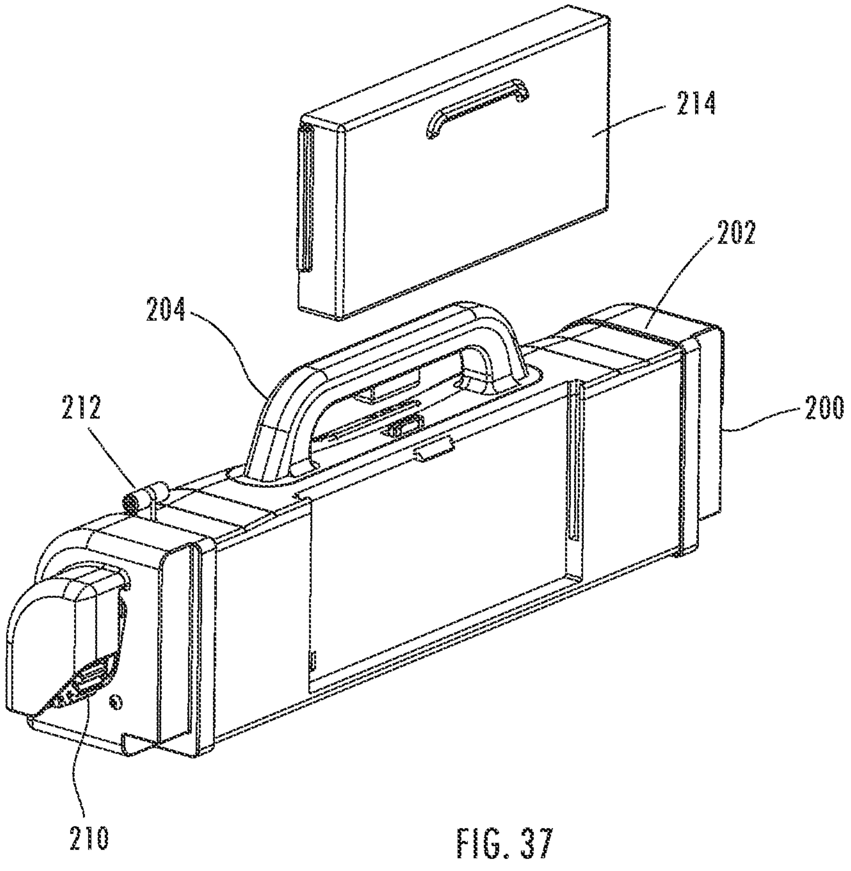
FIG. 37 is a top right front perspective view of the electrical power assistance device of FIG. 30, illustrating the battery pack removed.
Figure 38:
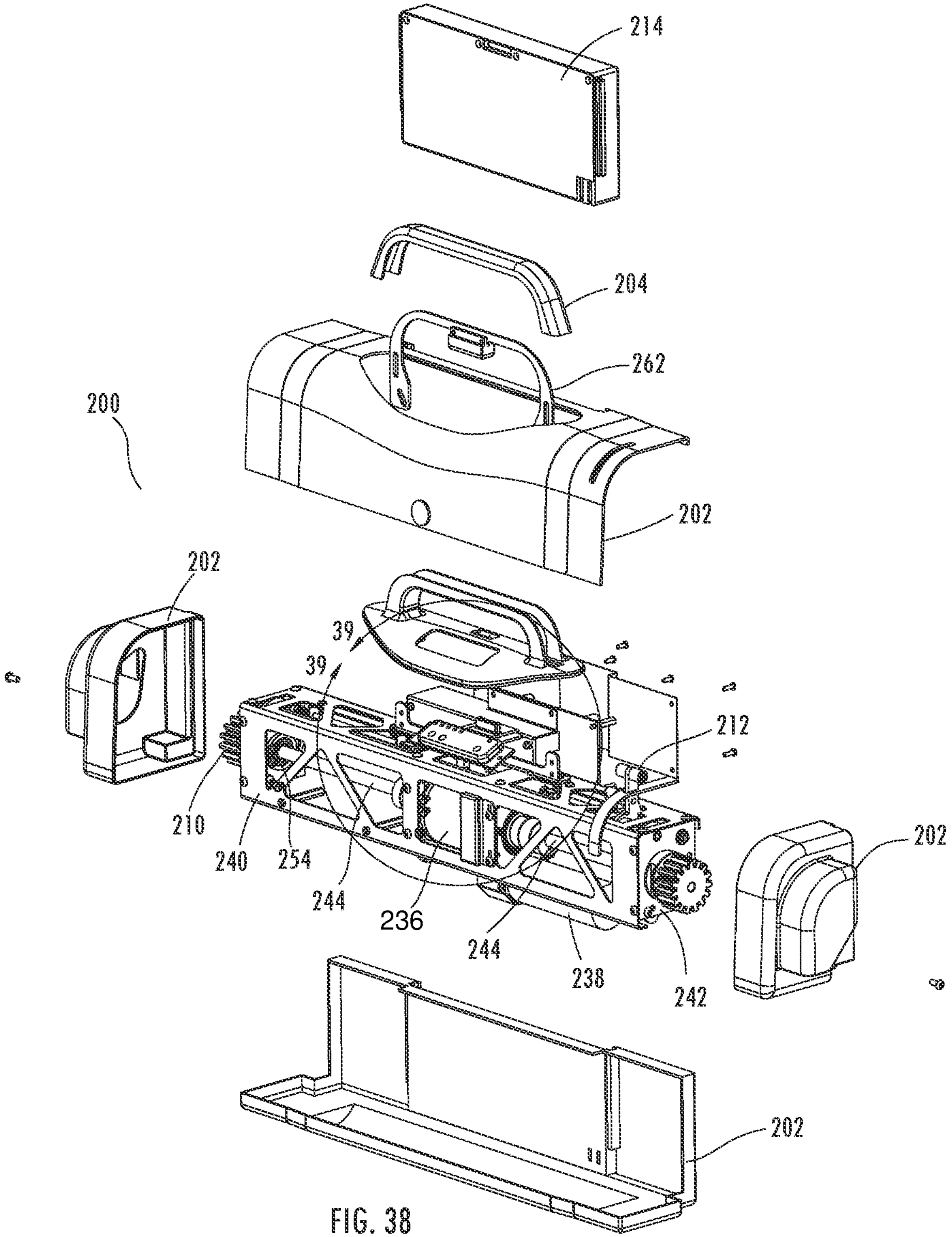
FIG. 38 is a partially exploded view of the electrical power assistance device of FIG. 30.
Figure 39:
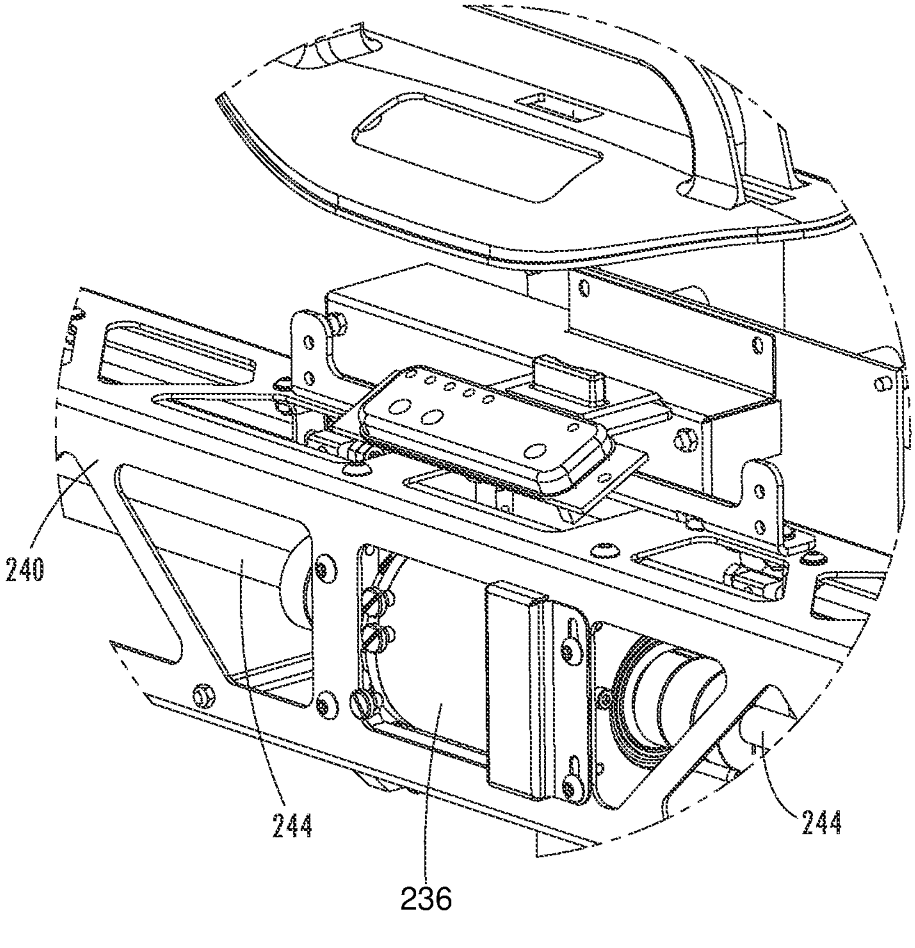
FIG. 39 is a partial view taken along lines 39-39 of FIG. 38.
Figure 40:
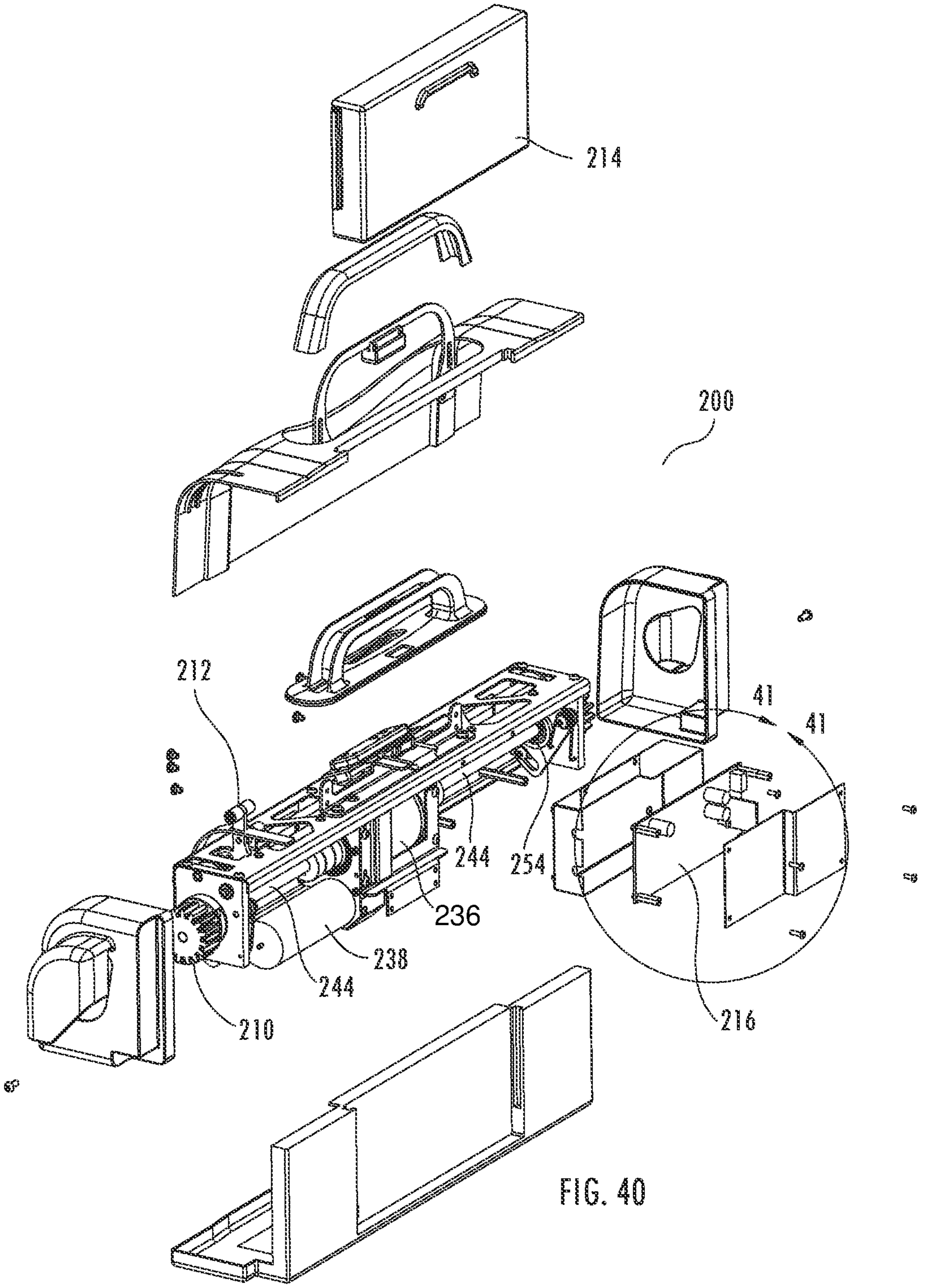
FIG. 40 is a partially exploded view of the electrical power assistance device of FIG. 30.
Figure 41:
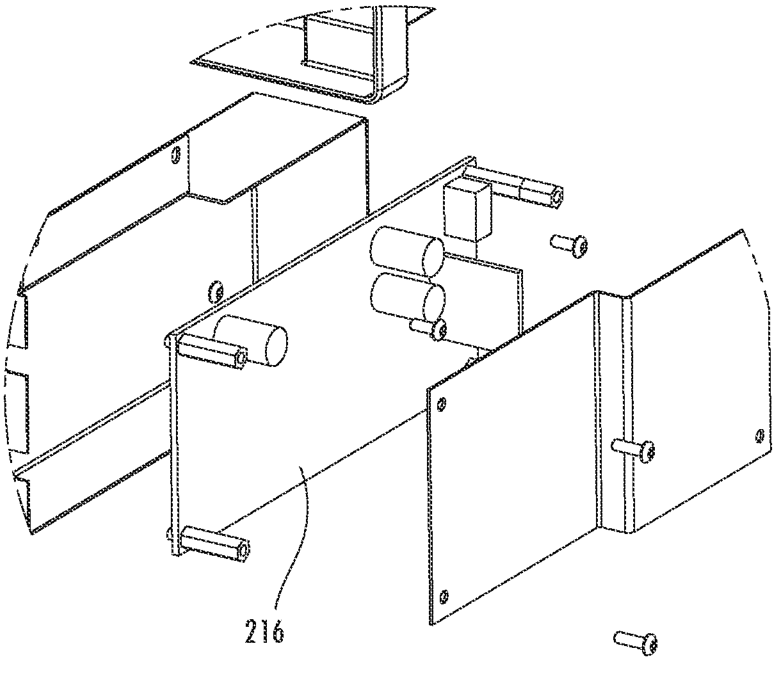
FIG. 41 is a partial view taken along lines 41-41 of FIG. 40.
Figure 42:
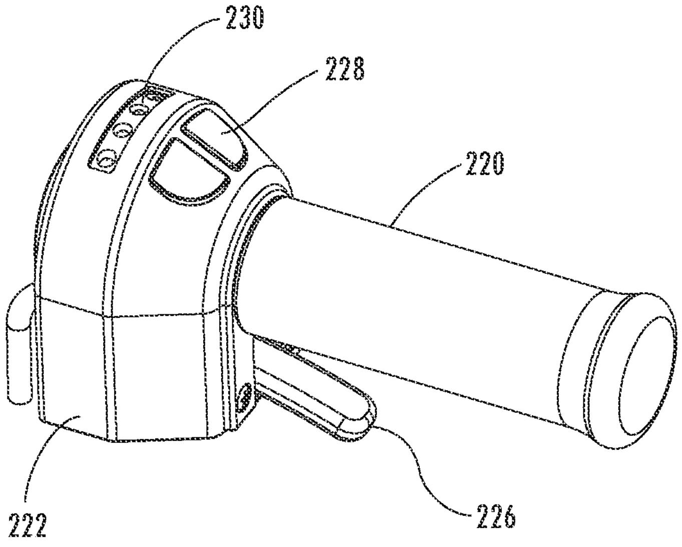
FIG. 42 is a perspective view of a controller for an electrical power assistance device.
Figure 43:
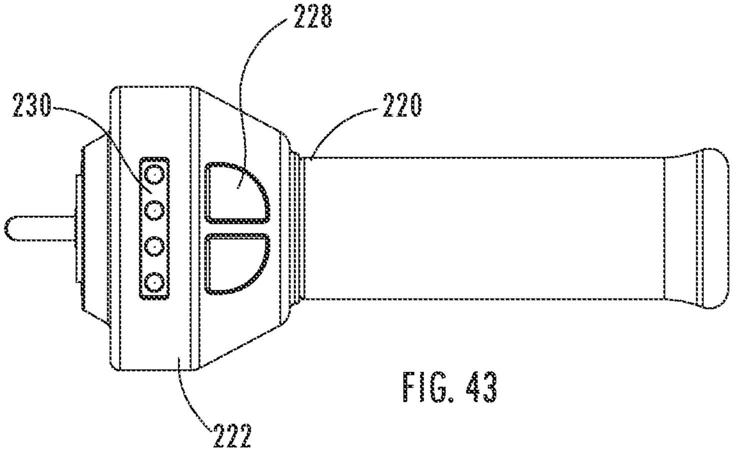
FIG. 43 is a top view of the controller of FIG. 42.
Figure 44:
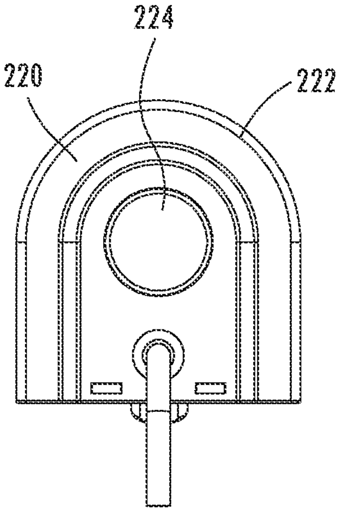
FIG. 44 is a front view of the controller of FIG. 42.
Figure 45:
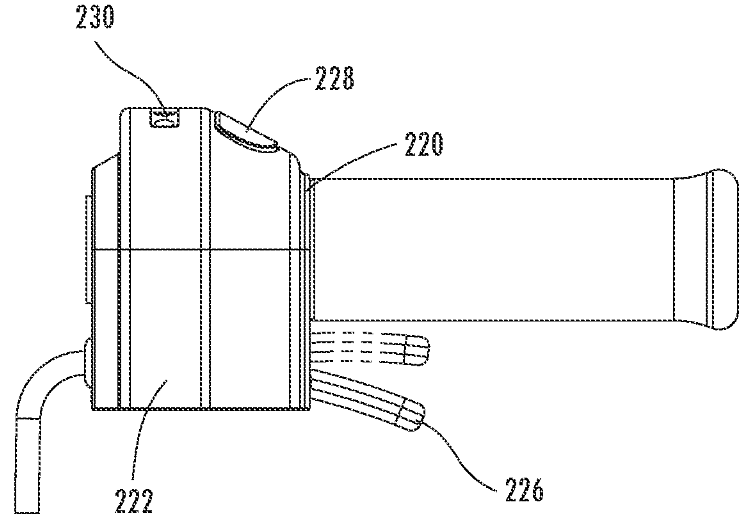
FIG. 45 is a left-side view of the controller of FIG. 42.
Figure 46:
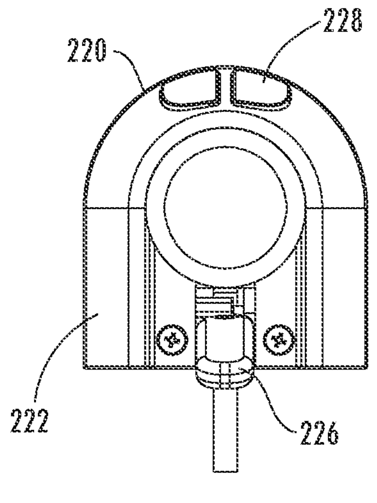
FIG. 46 is a rear-view of the controller of FIG. 42.
Figure 47:
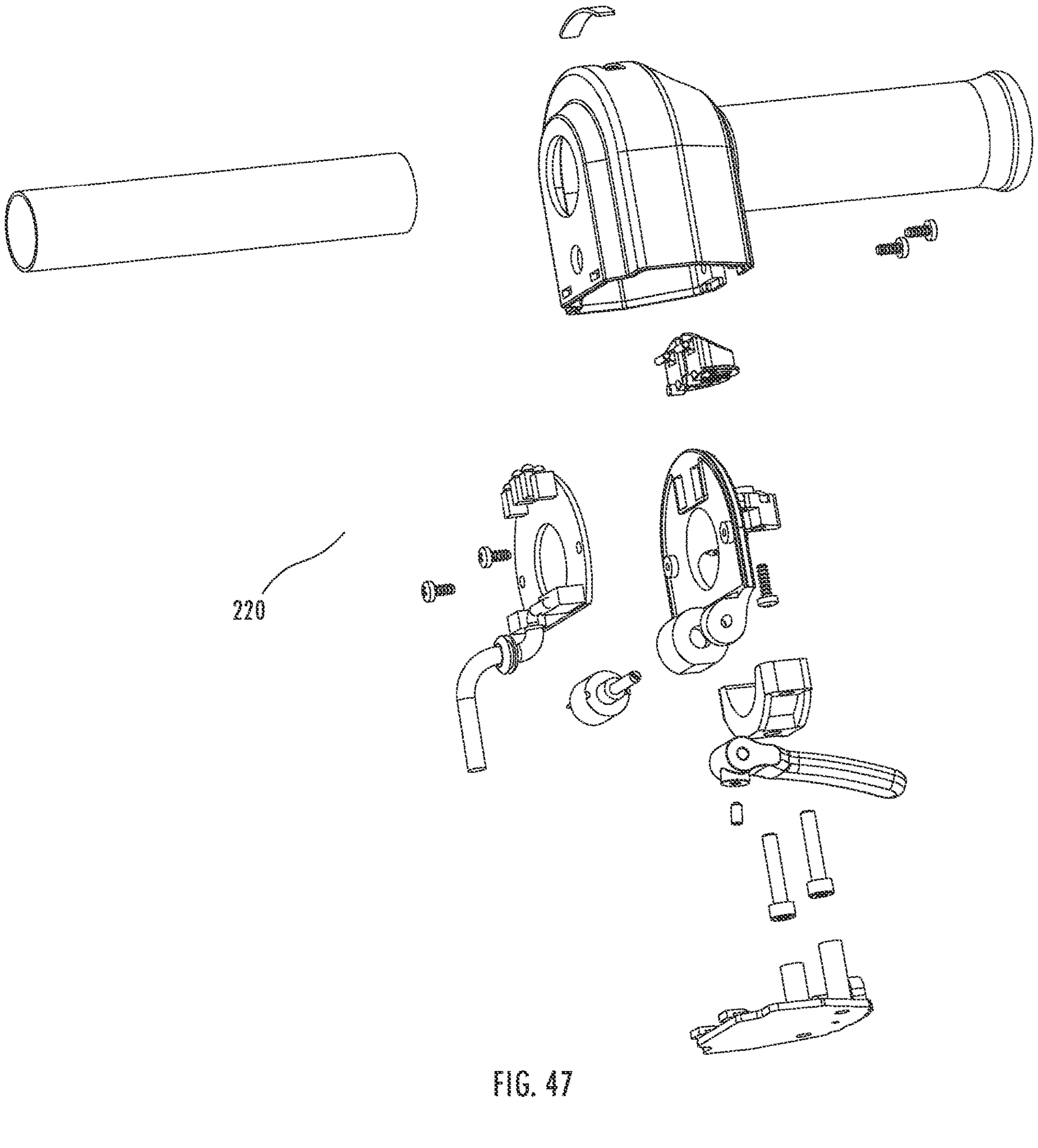
FIG. 47 is a front-perspective partially exploded view of the controller of FIG. 42.
Figure 48:
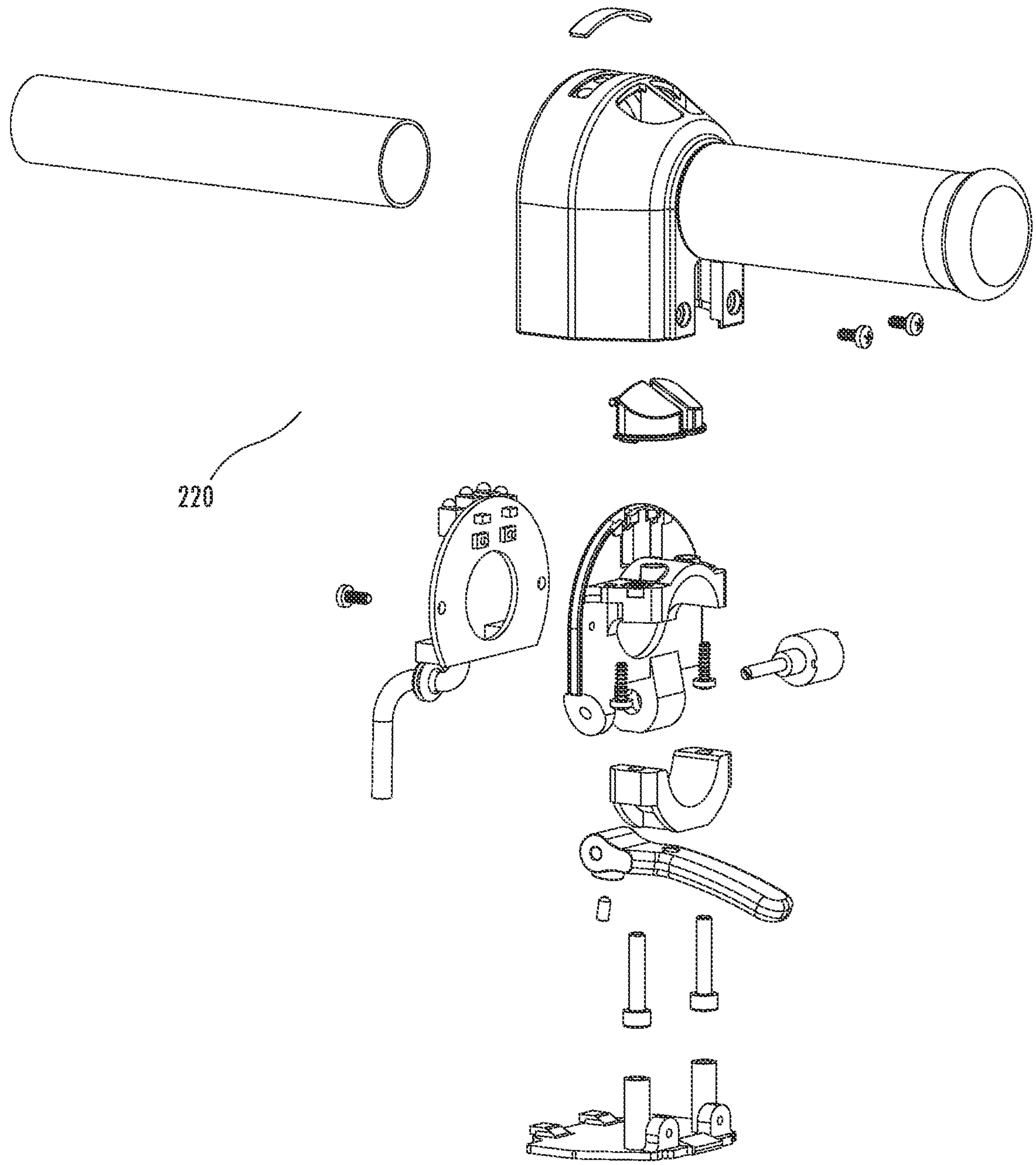
FIG. 48 is a rear-perspective partially exploded view of the controller of FIG. 42.
Figure 49:
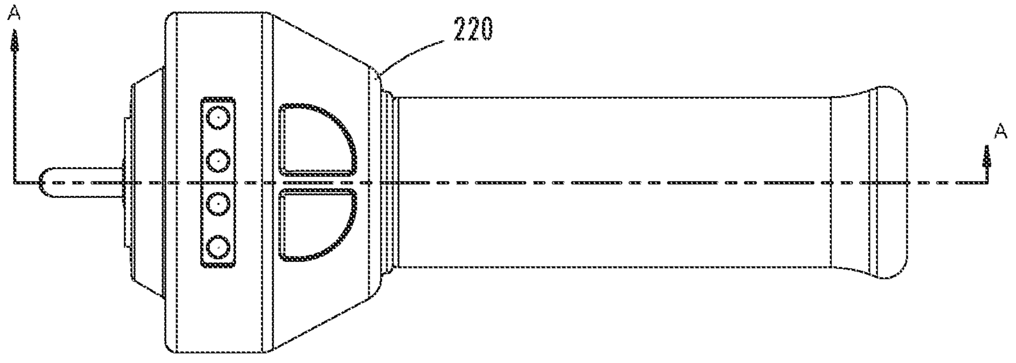
FIG. 49 is a top view of an embodiment of a controller for an electrical power assistance device.
Figure 50:
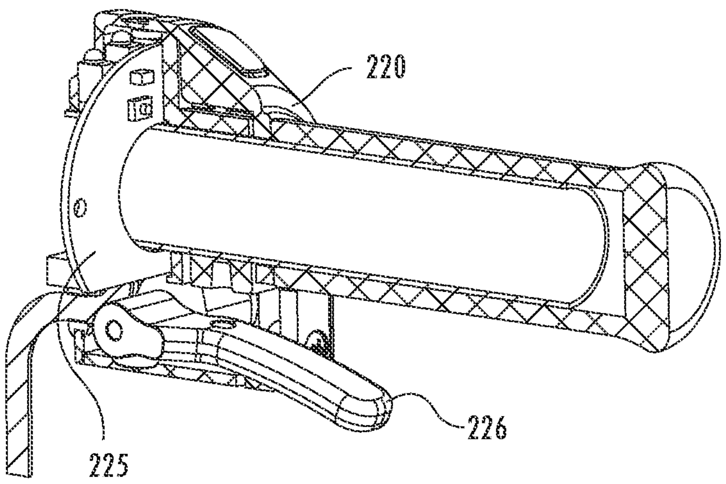
FIG. 50 is a partial view taken along the lines A-A of FIG. 49.
Figure 51:
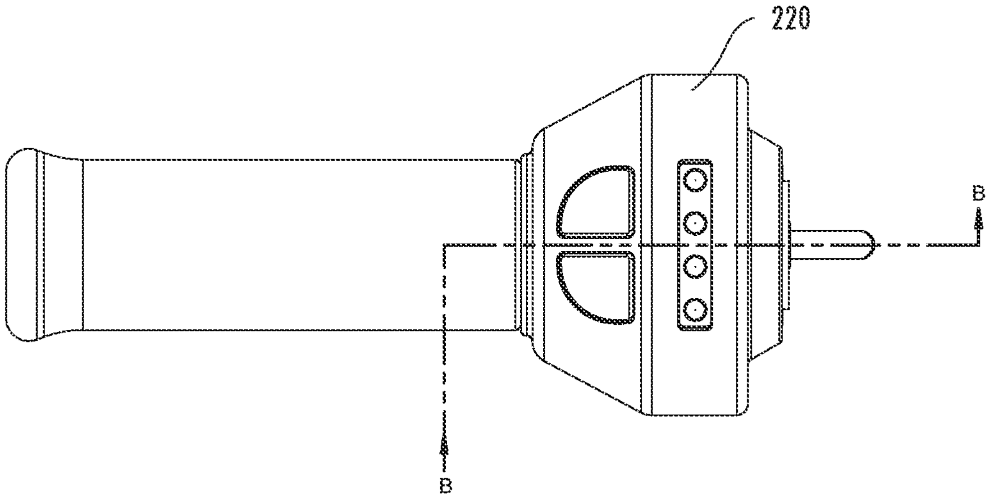
FIG. 51 is an alternate top view of the controller of FIG. 49.
Figure 52:
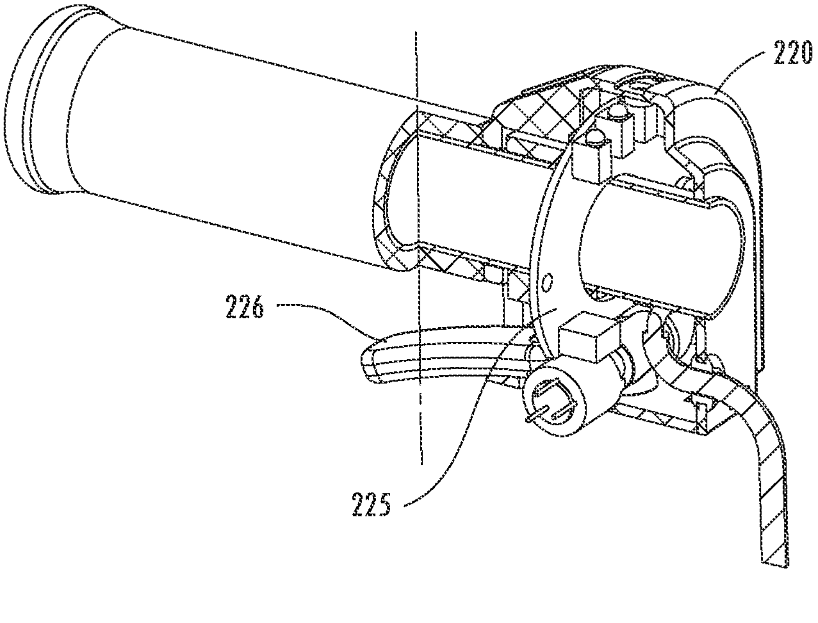
FIG. 52 is a partial view taken along the lines B-B of FIG. 51.
Figure 53:
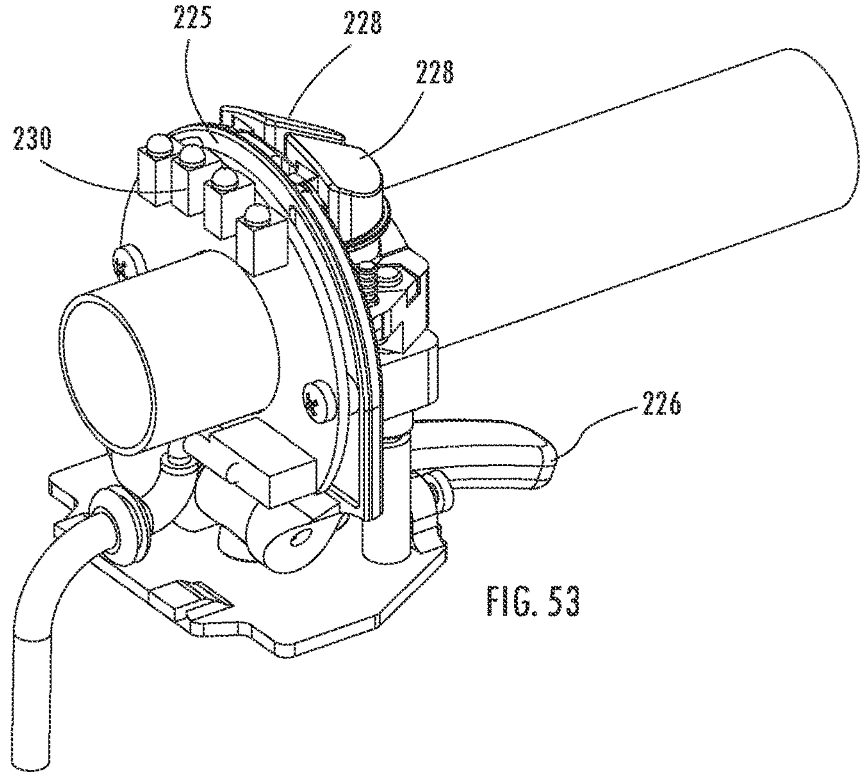
FIG. 53 is a front perspective view of the inner portion of the controller of FIG. 42.
Figure 54:
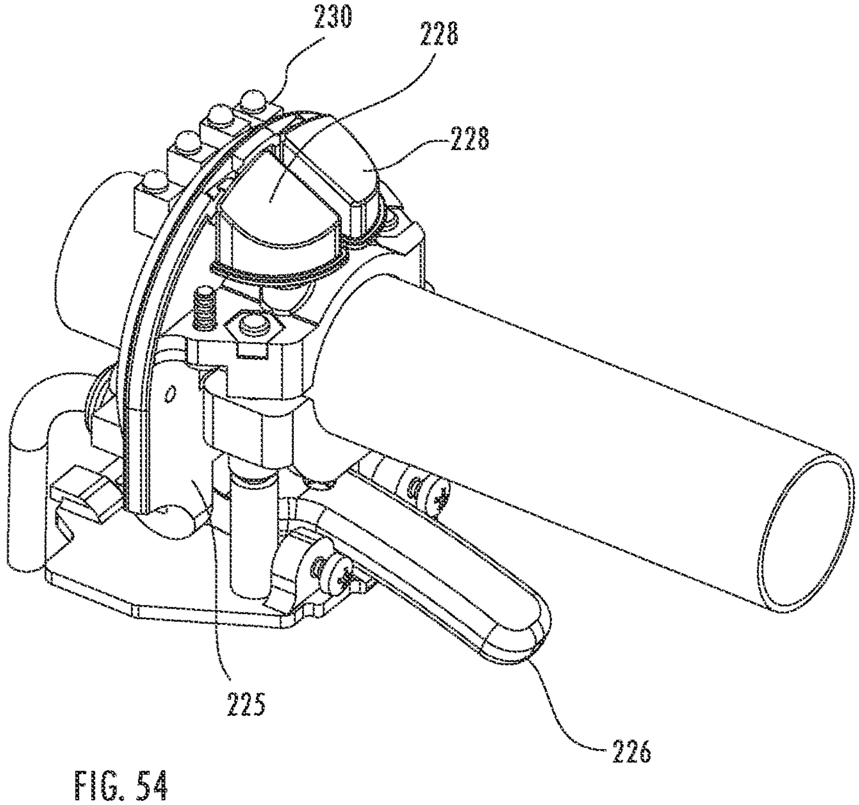
FIG. 54 is a rear perspective view of the inner portion of the controller of FIG. 42.
Figure 55:
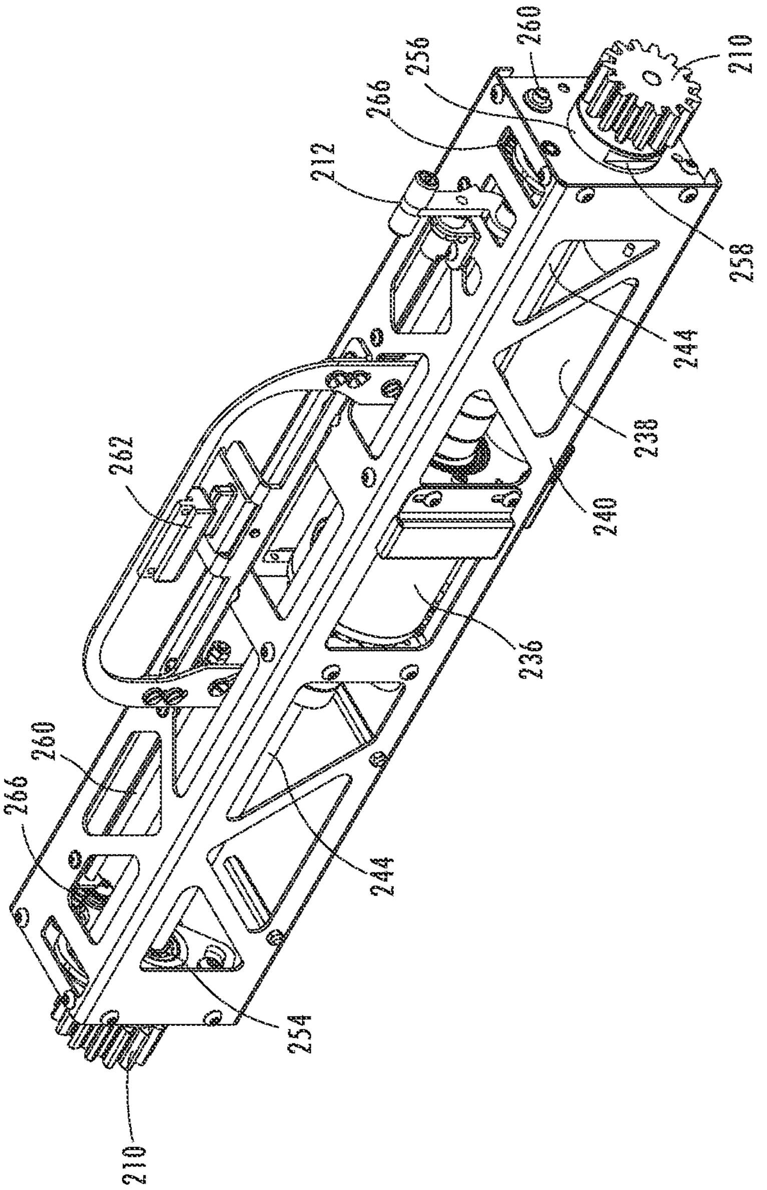
FIG. 55 is a rear perspective view of the inner components of an electrical power assistance device as shown in FIG. 42.
Figure 56:
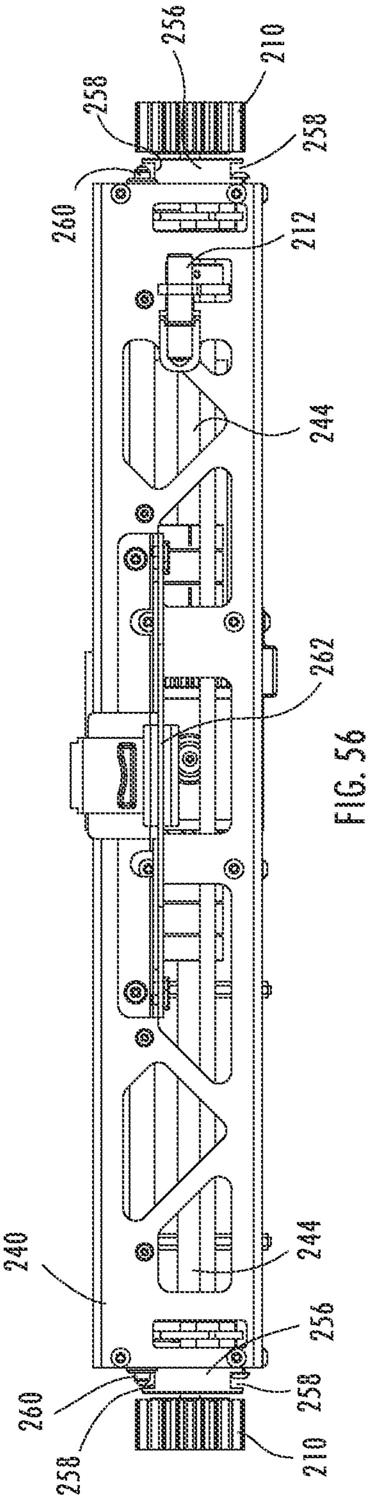
FIG. 56 is a top view of FIG. 55.
Figure 57:
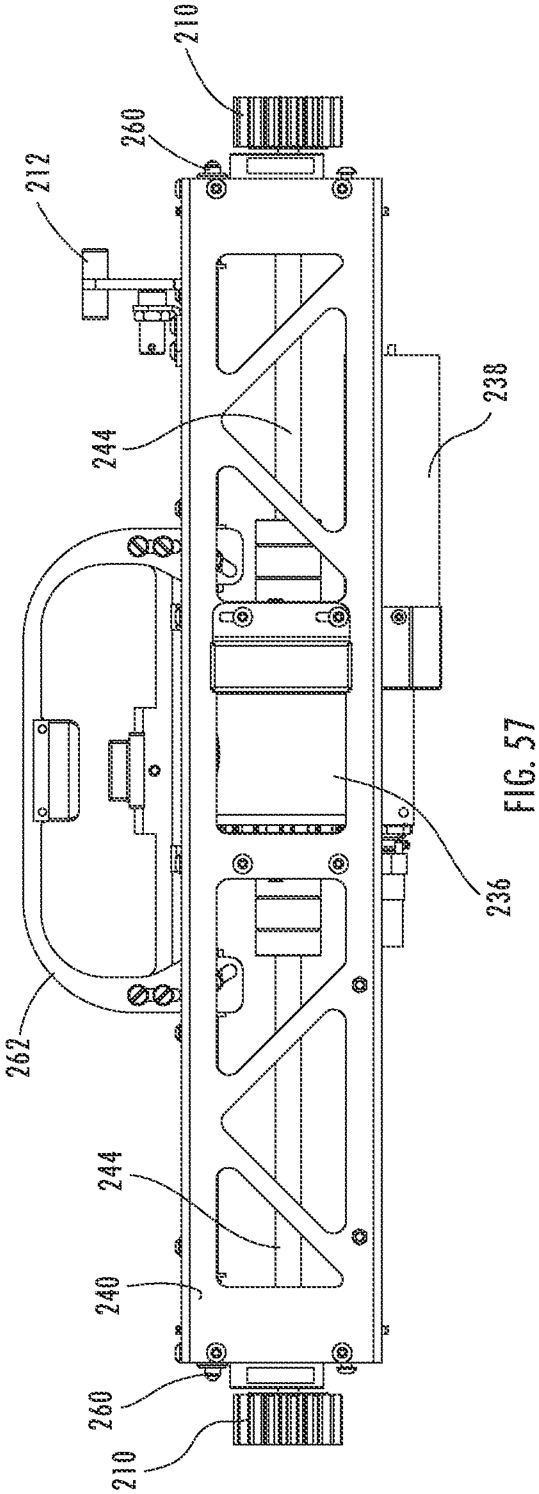
FIG. 57 is a front view of FIG. 55.
Figure 58:
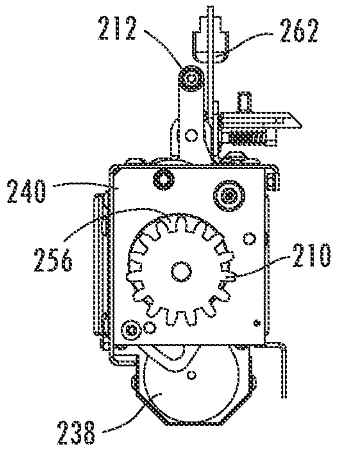
FIG. 58 is a left-side view of FIG. 55.
Figure 59:
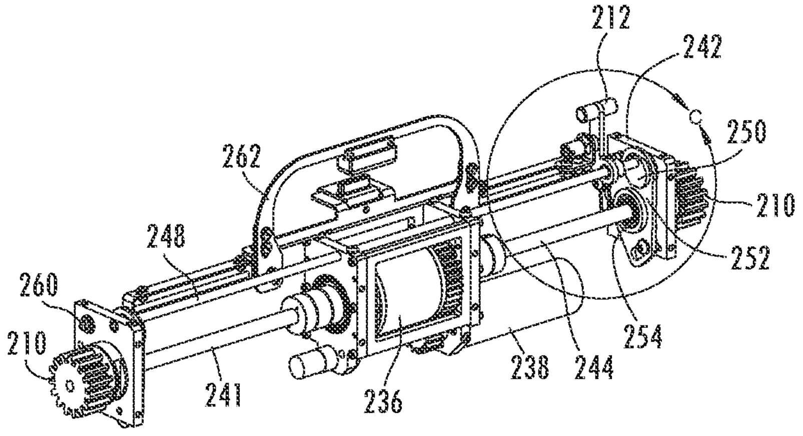
FIG. 59 is a rear left perspective view of the drive components of an electrical power assistance device with the engagement lever in the open position.
Figure 60:
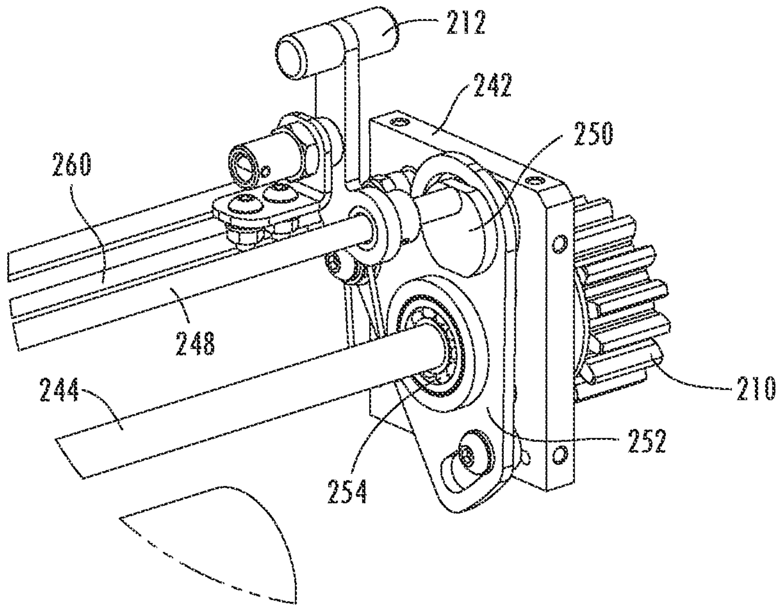
FIG. 60 is a partial view taken along lines C-C of FIG. 59.
Figure 61:
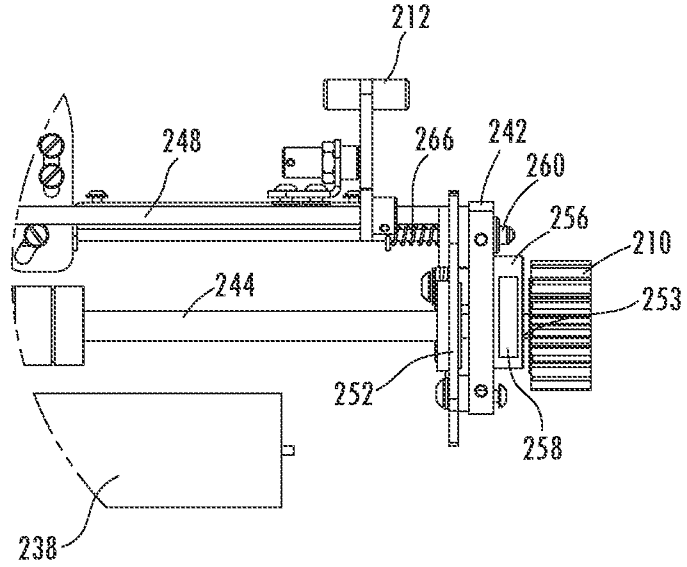
FIG. 61 is a left-side view of FIG. 59.
Figure 62:
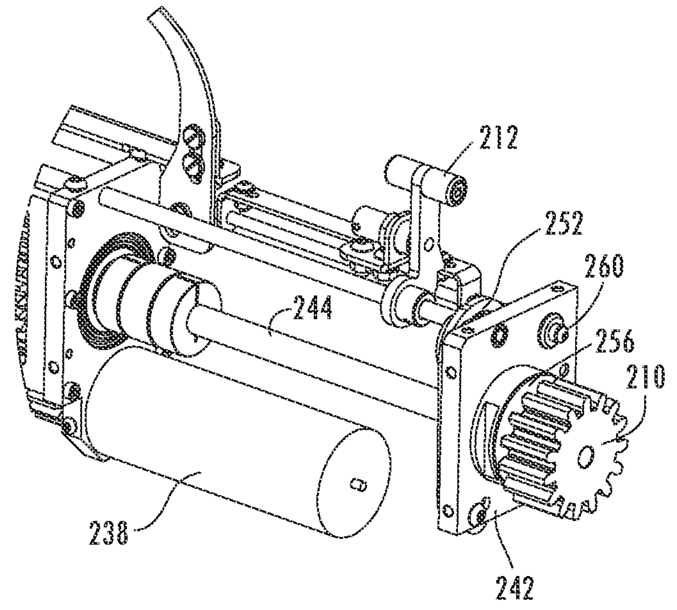
FIG. 62 is a right perspective view of FIG. 59.
Figure 63:
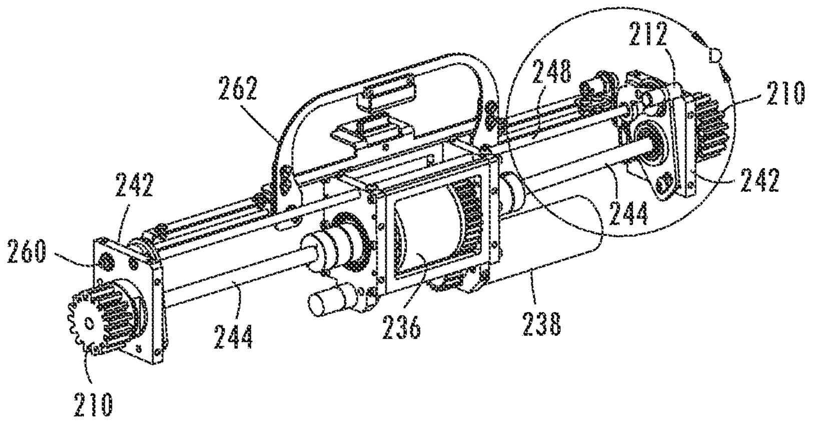
FIG. 63 is a rear left perspective view of the drive components of an electrical power assistance device with the engagement lever in the engaged position.
Figure 64:
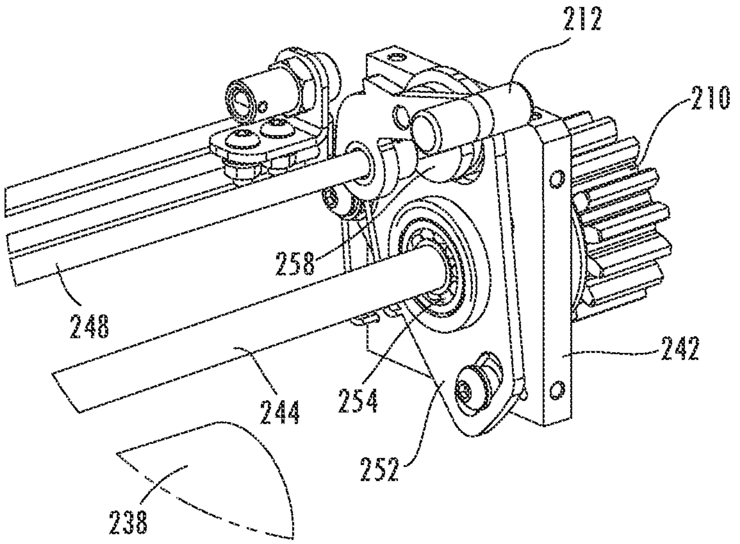
FIG. 64 is partial view taken along lines D-D of FIG. 63.
Figure 65:
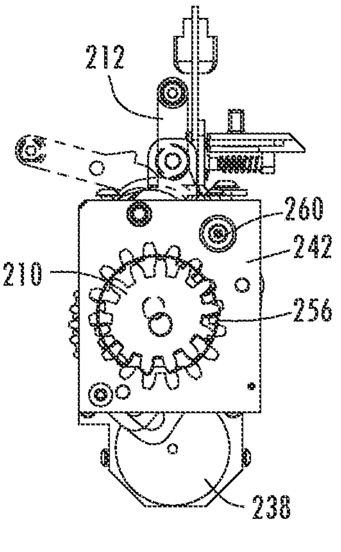
FIG. 65 is a left side view of the drive components of an electrical power assistance device showing the operation of the engagement lever.
Figure 66:
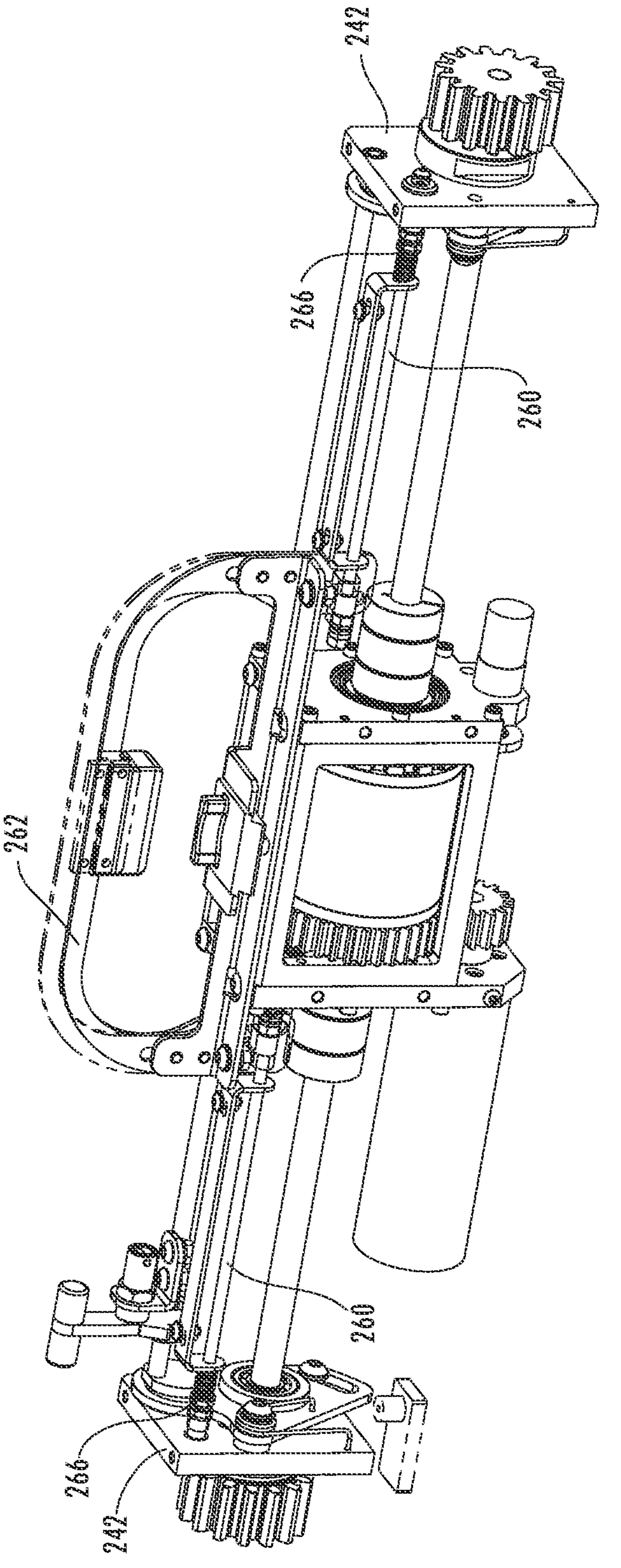
FIG. 66 is a perspective view of the drive components of an electrical power assistance device showing the attachment mechanism.
Figure 67:
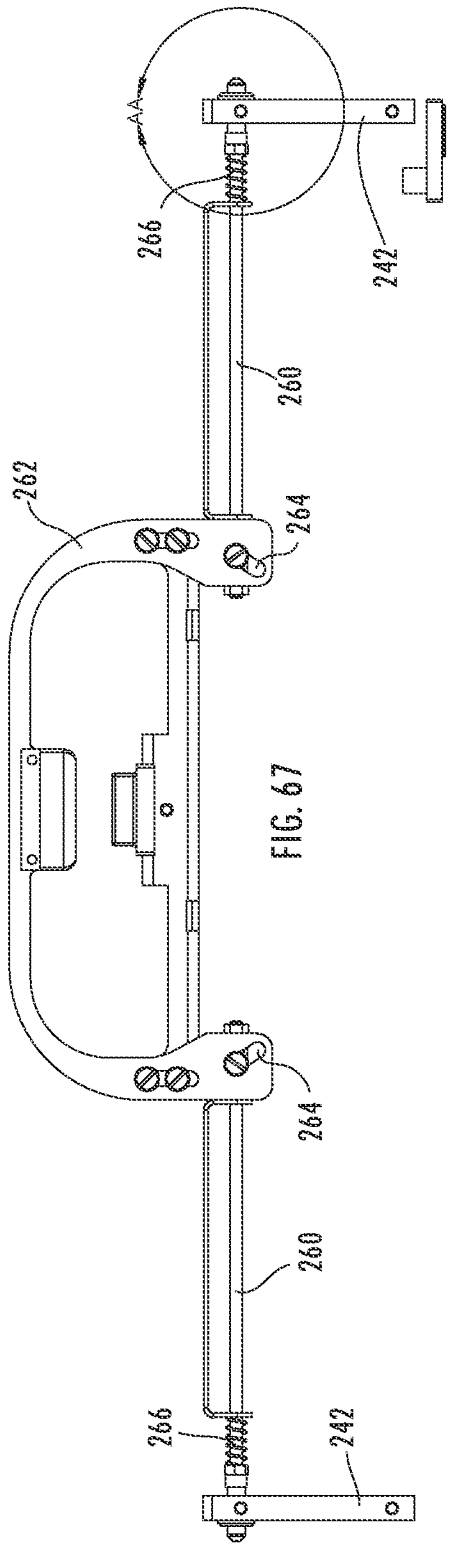
FIG. 67 is a rear view of the attachment mechanism in the locked position.
Figure 68:
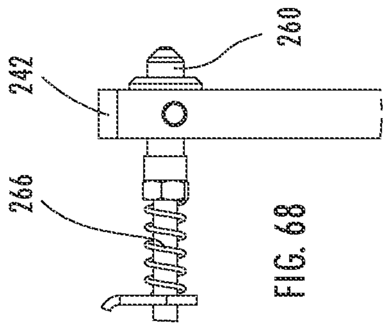
FIG. 68 is a partial view taken along lines AA-AA of FIG. 67.
Figure 69:
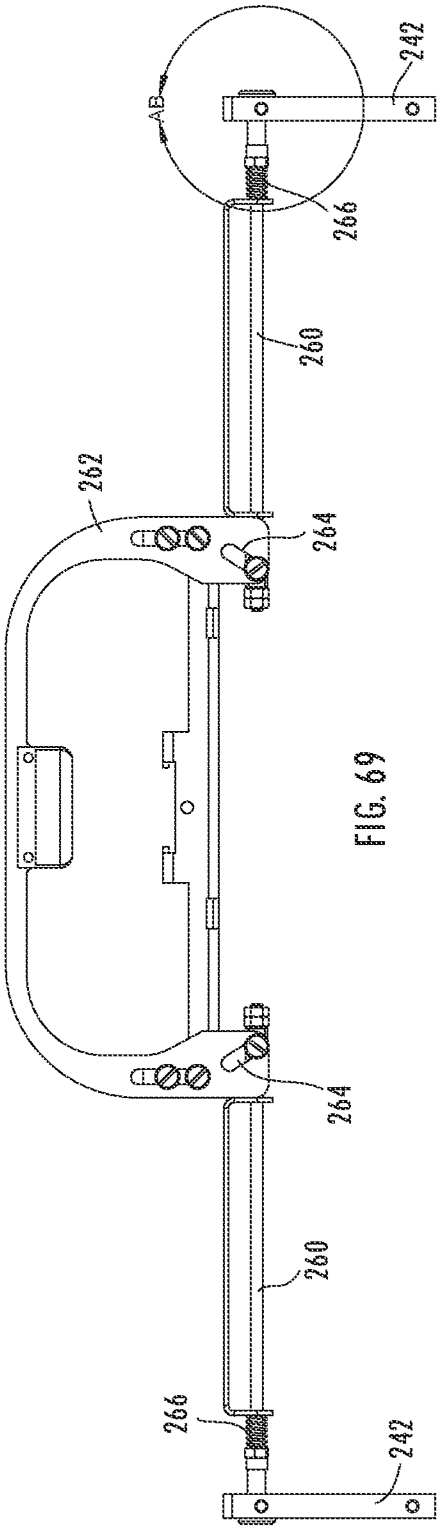
FIG. 69 is a rear view of the attachment mechanism in the open position.
Figure 70:
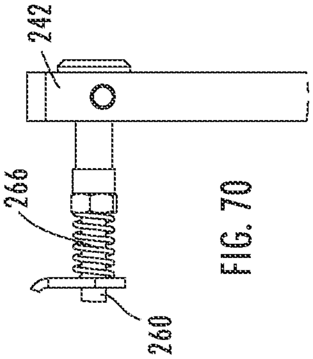
FIG. 70 is a partial view taken along lines AB-AB of FIG. 69.

FIGS. 15-77 illustrate another embodiment of the electrical power assistance device (200) of the present invention designed to be removably coupled to a transport wheelchair (102). The electrical power assistance device (200) includes a housing (202) having a handle (204) to allow it to be more easily attached and detached from the transport wheelchair (102). The electrical power assistance device (200) attaches to the transport wheelchair (102) by brackets (206, 208) which allows the electrical power assistance device (200) to securely engage with the frame (104) of the transport wheelchair and mechanically couple to the wheels (106, 108) of the transport wheelchair (102).

In the embodiment disclosed in FIGS. 15-75, the electrical power assistance device (200) mechanically couples to the wheels (106, 108) through gearing (110) on the inner side of the wheels which corresponds to gearing (210) within the housing (202) of the electrical power assistance device (200). The wheel gearing (110) is coupled to the wheels (106, 108) and includes a housing (112).

A controller (220), which can attach to the transport wheelchair (100) as one of the handles, allows a user to control the amount of assistance provided by the electrical power assistance device (200), and whether the device (200) provides assistance in the forward direction or reverse direction. The controller (220) can be either electrically coupled through a cable connection to the electrical power assistance device (200), or it can connect wirelessly. The controller (220) includes a housing (222), with an opening (224) to slide over the handle portion of the chair frame (104). Within the housing (222), the controller (220) includes a potentiometer (225) with a trigger (226) to control the amount of assistance provided by the electrical power assistance device (200) to the transport wheelchair (102). The controller (220) also includes buttons (228) allowing the controller (220) to direct whether the electrical power assistance device (200) provides assistance in the forward direction or the reverse direction.

A series of 4 LED lights (230) can be included with the controller (220). The lights (230) can be used to indicate the battery charge. Alternatively, the lights (230) can be used to indicate the level of power assistance being provided by the electrical power assistance device (200).

Within the housing (202), the drive components of the electrical power assistance device are housed within a frame (240) including two end plates (242). Powered by a removable and rechargeable battery (214), and controlled by the control board (216), the motor (238) drives a 2-part internal drive shaft (244) with a differential (236) between the two portions of the drive shaft (244). The distal ends of the portions of the drive shaft (244) are coupled to the drive gearing (210) which corresponds to the wheel gearing (110) for power assistance. To engage the drive gearing (210), the engagement lever (212) is moved from a first position to a second position.

The engagement lever (212) is coupled to an engagement shaft (248) having an eccentric disc (250) on each end. The rotation of the eccentric discs (250) moves an engagement plate (252) which is coupled to both the drive shaft (244) and the engagement shaft (248). When the engagement plate (252) is moved by the eccentric disc (250), it rotates around bearings (254) located around the drive shaft (244) and operates to lower the drive gearing (210) into an operable position to drive the corresponding wheel gearing (110).

The wheel gearing (210) is coupled by an angled shaft (253), which runs from the engagement plate (252) through the end plate (242) and frame coupling (256). The rotation of the engagement plate (252) changes the angle of the angled shaft (253) so that the wheel gearing (210) lowers into position, as shown more clearly in FIGS. 59-65.

When attaching the electrical power assistance device (200) to the brackets (206, 208), the frame couplings (256) lowers into the U-shaped portion of the brackets (206, 208). The frame couplings (256) include slots (258) which correspond to the vertical portions of the U-shaped portion of the brackets (206, 208). When lowering the electrical power assistance device (200) into the brackets (206, 208), the outer surface of the end plates (242) line up against the inner surface of the brackets (206, 208). The electrical power assistance device (200) then locks into place by pins (260), which lock into apertures (207) on the brackets.

When the electrical power assistance device (200) is grasped by the handle (204), the weight of the unit causes an inner handle lever (262) to move, retracting the pins (260) and allowing the unit to disengage from the brackets (206, 208). The pins (260) are coupled to the handle lever (262) in angled slots (264). Springs (266) bias the pins (260) to an extended position; however, when the handle lever (262) is moved vertically upward, the angled slots (264) cause the pins (260) to be pulled inward from the end plates (242), releasing the electrical power assistance device (200) from the brackets (206, 208).

As shown in FIGS. 71-77, the electrical power assistance device (200) can include a brake (278) which catches the gears of the differential (236) to prevent the drive shaft (244) from rotating. Alternatively, as shown in FIGS. 78-84, the electrical power assistance device (200) can include an emergency brake (280). In the disclosed embodiment, the emergency brake (280) includes a lever (282) pivotally connected to the device. A pair of solenoid actuators (284) are employed, such that the push rods (286) of each actuator (284) force the lever (282) into either the operating position (shown in FIG. 81) or the locked position (shown in FIG. 82). In the locked position, the lever (282) blocks the gears of the motor (238), thus preventing the drive shaft (244) from turning, thus preventing the wheels (106, 108) from moving.

In a further embodiment, an electrical power assistance device can be equipped with an electric braking power generator which can be used to aid in recharging the batteries for extended life between charges.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/ figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A power assistance device for a transport wheelchair comprising:

a housing securable to a wheelchair, said housing containing an electric motor having output shaft, a first gear connected to the output shaft for rotational motion with the output shaft, the first gear intermeshed with a second gear, the second gear secured to a differential, the differential including a pair of driveshafts, having one driveshaft connectable to each rear wheel of the transport wheelchair, wherein the differential allows power to be applied to the rear wheels of the transport wheelchair to facilitate even distribution of the power for moving the transport wheelchair along a straight path as well as allowing one rear wheel to rotate faster than the other rear wheel to facilitate turning the wheelchair while force is provided from the electric motor.

2. The power assistance device for a transport wheelchair as claimed in claim 1 wherein the rear wheels include individually operable brakes, wherein operation of one brake causes the differential to deliver more power to the rear wheel where the brake is not in operation to cause turning of the transport wheelchair.

3. The power assistance device for a transport wheelchair as claimed in claim 1 wherein a braking force applied to one side of the transport wheelchair from a transport wheelchair operator causes the differential to deliver more power to the rear wheel where the braking force is not applied to cause turning of the transport wheelchair.

4. The power assistance device for a transport wheelchair as claimed in claim 1 wherein a distal end of each driveshaft includes a friction wheel for rotating the respective rear wheel of the transport wheelchair.

5. The power assistance device for a transport wheelchair as claimed in claim 1 wherein a distal end of each driveshaft includes a drive gear, the drive gear intermeshed with a wheel gear for rotating the respective rear wheel of the transport wheelchair.

6. The power assistance device for a transport wheelchair as claimed in claim 1 including a motor control board for receiving electrical signals from a controller for controlling the rotational speed of the electric motor.

7. The power assistance device for a transport wheelchair as claimed in claim 6 wherein the controller is coupled to a rear handle of the transport wheelchair and electrically coupled to the motor control board, the controller including a moveable portion for allowing electrical power to flow to the electric motor.

8. The power assistance device for a transport wheelchair as claimed in claim 7 wherein the moveable portion of the controller is a trigger.

9. The power assistance device for a transport wheelchair as claimed in claim 8 including a rechargeable battery electrically connected to the electric motor and the motor control board.

10. The power assistance device for a transport wheelchair as claimed in claim 9 wherein the controller includes a potentiometer operated by the trigger to control the amount of assistance that will be provided by the electric motor to the transport wheelchair.

11. The power assistance device for a transport wheelchair as claimed in claim 1 wherein the power assistance device is removable from the transport wheelchair.

12. The power assistance device for a transport wheelchair as claimed in claim 11 wherein the transport wheelchair is collapsible after removal of the power assistance device from the transport wheelchair.

13. The power assistance device for a transport wheelchair as claimed in claim 12 wherein the power assistance device is replaceable to the transport wheelchair after reinstating the transport wheelchair from its collapsed position.

* * * * *